US012359564B2

(12) United States Patent
Han et al.

(10) Patent No.: US 12,359,564 B2
(45) Date of Patent: Jul. 15, 2025

(54) SELF-CALIBRATED METHOD OF DETERMINING BOREHOLE FLUID ACOUSTIC PROPERTIES

(71) Applicants: Wei Han, Sugar Land, TX (US); Rocco DiFoggio, Houston, TX (US); James V. Leggett, III, Magnolia, TX (US)

(72) Inventors: Wei Han, Sugar Land, TX (US); Rocco DiFoggio, Houston, TX (US); James V. Leggett, III, Magnolia, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 18 days.

(21) Appl. No.: 17/838,801

(22) Filed: Jun. 13, 2022

(65) Prior Publication Data

US 2022/0325622 A1 Oct. 13, 2022

Related U.S. Application Data

(62) Division of application No. 16/351,145, filed on Mar. 12, 2019, now Pat. No. 11,359,488.

(51) Int. Cl.
*E21B 49/08* (2006.01)
*G01V 1/50* (2006.01)

(52) U.S. Cl.
CPC ............... *E21B 49/08* (2013.01); *G01V 1/50* (2013.01); *E21B 49/0875* (2020.05)

(58) Field of Classification Search
CPC ........ E21B 49/08; E21B 49/0875; G01V 1/50
See application file for complete search history.

(56) References Cited

U.S. PATENT DOCUMENTS 4,022,055 A   5/1977   Flournoy et al.
4,302,286 A   11/1981  Lefebvre et al.
(Continued)

FOREIGN PATENT DOCUMENTS

WO   2015175905 A1   11/2015

OTHER PUBLICATIONS

International Search Report for PCT Application PCT/US2020/021887; mailed Jul. 2, 2020; 4 pages.
(Continued)

*Primary Examiner* — John Fitzgerald
(74) *Attorney, Agent, or Firm* — CANTOR COLBURN LLP

(57) ABSTRACT

Methods, systems, and devices for determining an acoustic parameter of a downhole fluid using an acoustic assembly. Methods include transmitting a plurality of pulses; measuring values for at least one wave property measured for reflections of the plurality of pulses received at at least one acoustic receiver, including: a first value for a first reflection traveling a first known distance from a first acoustically reflective surface having a first known acoustic impedance, a second value for a second reflection traveling a second known distance substantially the same as the first known distance from a second acoustically reflective surface having a second known acoustic impedance, and a third value for a third reflection traveling a third known distance from a third acoustically reflective surface having a third known acoustic impedance substantially the same as the second acoustic impedance; and estimating the acoustic parameter using the values.

14 Claims, 14 Drawing Sheets

(56) References Cited

U.S. PATENT DOCUMENTS

| | | | |
|---|---|---|---|
| 4,571,693 A | 2/1986 | Birchak et al. | |
| 4,685,091 A | 8/1987 | Chung et al. | |
| 4,757,821 A | 7/1988 | Snyder | |
| RE33,837 E | 3/1992 | Chung et al. | |
| 5,341,345 A | 8/1994 | Warner et al. | |
| 5,354,956 A | 10/1994 | Orban et al. | |
| 5,763,773 A * | 6/1998 | Birchak | E21B 47/005 73/152.58 |
| 5,995,447 A * | 11/1999 | Mandal | G01V 1/44 367/27 |
| 6,041,861 A | 3/2000 | Mandal et al. | |
| 6,082,181 A | 7/2000 | Greenwood | |
| 6,125,079 A | 9/2000 | Birchak et al. | |
| 6,330,831 B1 | 12/2001 | Lynnworth et al. | |
| 6,618,322 B1 | 9/2003 | Georgi | |
| 6,712,138 B2 | 3/2004 | Mandal | |
| 6,957,700 B2 | 10/2005 | Mandal | |
| 7,107,581 B2 | 9/2006 | Owen | |
| 7,194,907 B2 | 3/2007 | Abbate et al. | |
| 7,377,169 B2 | 5/2008 | Myers et al. | |
| 7,587,936 B2 | 9/2009 | Han | |
| 7,950,451 B2 * | 5/2011 | Alberty | E21B 47/10 175/48 |
| 9,109,433 B2 | 8/2015 | DiFoggio et al. | |
| 9,366,133 B2 | 6/2016 | DiFoggio | |
| 9,594,057 B2 | 3/2017 | DiFoggio | |
| 9,631,480 B2 * | 4/2017 | Cooper | E21B 47/107 |
| 9,664,034 B2 | 5/2017 | Mandal | |
| 10,408,052 B2 | 9/2019 | Mandal et al. | |
| 10,436,020 B2 | 10/2019 | Mandal | |
| 11,359,488 B2 * | 6/2022 | Han | G01H 15/00 |
| 2004/0093948 A1 | 5/2004 | Kelner et al. | |
| 2004/0095847 A1 | 5/2004 | Hassan et al. | |
| 2005/0223808 A1 | 10/2005 | Myers et al. | |
| 2006/0067162 A1 | 3/2006 | Blankinship et al. | |
| 2006/0101916 A1 | 5/2006 | Griffiths et al. | |
| 2010/0258303 A1 | 10/2010 | Alberty | |
| 2010/0315900 A1 * | 12/2010 | DiFoggio | G01V 1/40 367/27 |
| 2014/0247694 A1 * | 9/2014 | DiFoggio | G01N 29/024 367/86 |
| 2015/0204819 A1 * | 7/2015 | DiFoggio | G01N 29/024 73/152.58 |
| 2016/0025884 A1 | 1/2016 | DiFoggio | |
| 2017/0183961 A1 | 6/2017 | Mandal et al. | |
| 2018/0320511 A1 | 11/2018 | Varela et al. | |
| 2020/0291776 A1 | 9/2020 | Han et al. | |

OTHER PUBLICATIONS

International Preliminary Report on Patentability for PCT/US2020/021887; mailed Sep. 14, 2021, 4 pages.

Written Opinion for PCT Application No. PCT/US2020/021887; mailed Jul. 2, 2020, 8 pages.

UBI Advanced borehole imaging independent of mud type, Schulmberger https://www.slb.com/-/media/files/fe/brochure/ubi-br.ashx, Jun. 2002, 12 pp.

Written Opinion for PCT Application PCT/US2020/021887; Mailed Jul. 20, 2020; 8 pages.

* cited by examiner

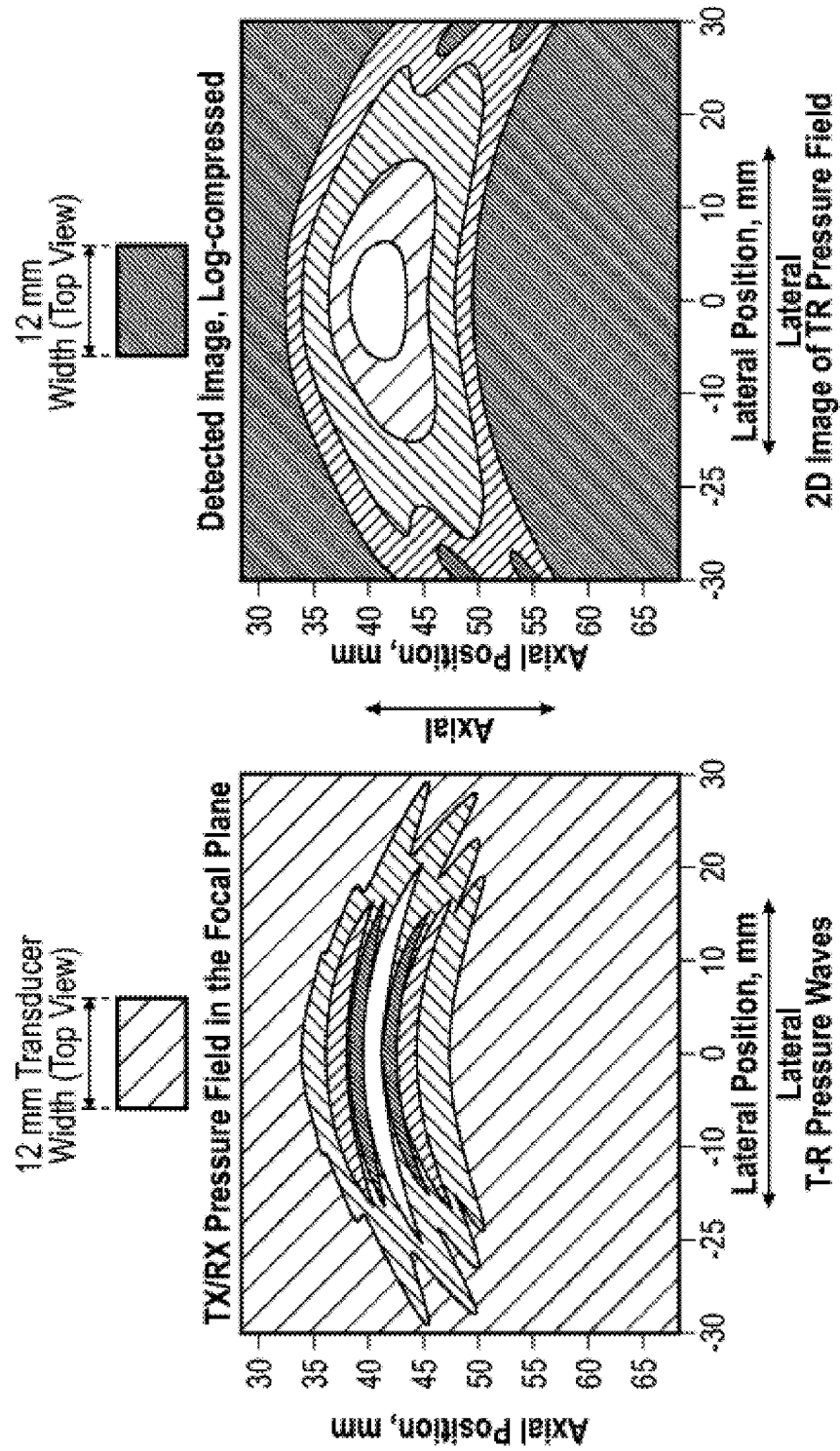

SELF-CALIBRATED METHOD OF DETERMINING BOREHOLE FLUID ACOUSTIC PROPERTIES

CROSS REFERENCE TO RELATED APPLICATIONS

This application is a division of U.S. patent application Ser. No. 16/351,145, filed on Mar. 12, 2019, the disclosure of which is incorporated herein by reference in its entirety.

FIELD OF THE DISCLOSURE

This disclosure generally relates to borehole tools, and in particular to methods and apparatuses for estimating a parameter of interest of a downhole fluid.

BACKGROUND OF THE DISCLOSURE

Determining the acoustic properties of downhole fluids may be desirable for several types of downhole evaluation. Such properties may be used in characterizing the fluid itself, or for use in methods for evaluating the formation, the borehole, the casing, the cement, or for previous or ongoing operations in the borehole including exploration, development, or production.

For many of these techniques, it is desirable that variations in fluids filling the borehole (e.g., drilling fluid) be compensated for, because conventional processing is highly sensitive to the properties of the drilling fluid.

Thus, various techniques are currently employed to determine parameters of the fluid affecting acoustic measurements, such as acoustic impedance and sound speed, in order to interpret acoustic measurement data. Traditionally, time of flight of the acoustic signals traveling through a known pathlength of fluid has been used to determine sound speed, and additional measurements may be used to estimate at least one of acoustic impedance and density of the fluid.

SUMMARY OF THE DISCLOSURE

In aspects, the present disclosure is related to methods and apparatuses for determining a fluid's acoustic properties such as sound speed, acoustic impedance, and acoustic attenuation independent of an acoustic transducer's transmitted intensity or detection sensitivity by using more than one transducer and more than one reflector and by solving a set of simultaneous equations to determine these acoustic properties.

Aspects include methods of determining an acoustic parameter of a downhole fluid using an acoustic assembly comprising a plurality of acoustic reflectors each having at least one acoustically reflective surface at least partially immersed in the downhole fluid. Methods may include transmitting a plurality of pulses; measuring values for at least one wave property measured for reflections of the plurality of pulses received at at least one acoustic receiver; and estimating the acoustic parameter using the values. The values may include a first value for a first reflection traveling a first known distance from a first acoustically reflective surface having a first known acoustic impedance; a second value for a second reflection traveling a second known distance substantially the same as the first known distance from a second acoustically reflective surface having a second known acoustic impedance substantially different than the first acoustic impedance; and a third value for a third reflection traveling a third known distance substantially different from each of the first distance and the second distance from a third acoustically reflective surface having a third known acoustic impedance substantially the same as the second acoustic impedance. The plurality of pulses and the reflections are each transmitted through the downhole fluid. Each of the first value, the second value, and the third value may be substantially different from others of the first value, the second value, and the third value. At least two of the first reflection, the second reflection, and the third reflection may be reflections of a particular pulse.

The first known distance may be a distance from the first acoustically reflective surface to an acoustic receiver during the measuring, the second known distance may be a distance from the second acoustically reflective surface to the acoustic receiver during the measuring, and the third known distance may be a distance from the third acoustically reflective surface to the acoustic receiver during the measuring. The acoustic receiver may be configured to rotate about an axis of the assembly; the first acoustically reflective surface, the second acoustically reflective surface, and the third acoustically reflective surface may be azimuthally distributed about the axis, such that each of the first reflection, the second reflection, and the third reflection each return to the acoustic receiver from a different azimuth with respect to the axis.

Aspects may include apparatus for determining an acoustic parameter of a downhole fluid in a borehole. Apparatus may include a tool having disposed thereon an acoustic assembly, the acoustic assembly comprising at least one transducer and a plurality of acoustic reflectors having acoustically reflective surfaces. The tool may be configured to at least partially immerse at least one transducer and the acoustically reflective surfaces, and wherein the acoustic assembly is configured to i) transmit a plurality of pulses through the fluid, and ii) measure values for at least one wave property for reflections of the plurality of pulses, including: a first value for a first reflection traveling a first known distance from a first acoustically reflective surface having a first known acoustic impedance; a second value for a second reflection traveling a second known distance substantially the same as the first known distance from a second acoustically reflective surface having a second known acoustic impedance substantially different than the first acoustic impedance; and a third value for a third reflection traveling a third known distance substantially different from each of the first distance and the second distance from a third acoustically reflective surface having a third known acoustic impedance substantially the same as the second acoustic impedance. Apparatus may include a processor configured to estimate the acoustic parameter using the values. The at least one transducer may be configured to rotate about an axis of the assembly; and the first acoustically reflective surface, the second acoustically reflective surface, and the third acoustically reflective surface may be azimuthally distributed about the axis, such that each of the first reflection, the second reflection, and the third reflection each return to the acoustic receiver from a different azimuth with respect to the axis.

Aspects include a method of determining an acoustic parameter of a downhole fluid using an acoustic assembly comprising a plurality of acoustic reflectors each having at least one acoustically reflective surface at least partially immersed in the downhole fluid. Methods may include estimating the acoustic parameter using a value for at least one wave property measured for: a first reflection received at a first acoustic receiver (R1) of a first pulse from a first acoustically reflective surface located a first distance from the first acoustic receiver; a second reflection received at the first acoustic receiver (R1) of the first pulse from a second acoustically reflective surface located a second distance from the first acoustic receiver different than the first distance; a first reflection received at a second acoustic receiver (R2) of a second pulse from a third acoustically reflective surface located a third distance from the second acoustic receiver; and a second reflection received at the second acoustic receiver (R2) of the second pulse from a fourth acoustically reflective surface located a fourth distance from the second acoustic receiver different than the third distance. The first pulse, the first reflection of the first pulse, the second reflection of the first pulse, the second pulse, the first reflection of the second pulse, and the second reflection of the second pulse may each be transmitted through the downhole fluid. Methods may further comprise transmitting acoustic pulses using at least one acoustic transducer to generate the plurality of acoustic pulse reflections.

The at least one wave property may comprise travel time and amplitude. The first acoustically reflective surface may comprise a portion of a first acoustic reflector having a first impedance value and the second acoustically reflective surface may comprise a portion of a second acoustic reflector having a second impedance value substantially the same as the first impedance value. The third acoustically reflective surface may comprise a portion of a third acoustic reflector having a third impedance value and the fourth acoustically reflective surface may comprise a portion of a fourth acoustic reflector having a fourth impedance value substantially different than the third impedance value. The fourth impedance value may be substantially the same as at least one of: i) the first impedance value, and ii) the second impedance value.

The third acoustically reflective surface may comprise a portion of a third acoustic reflector having a third impedance value and the fourth acoustically reflective surface may comprise a portion of a fourth acoustic reflector having a fourth impedance value substantially different than the third impedance value. The first acoustically reflective surface may comprise a portion of a first acoustic reflector having a first impedance value and the third acoustically reflective surface may comprise another portion of the first acoustic reflector having the first impedance value.

The first distance may be less than the second distance and the third distance may be less than the fourth distance, and estimating the acoustic parameter may comprise estimating an acoustic impedance for the downhole fluid using an impedance of the third acoustically reflective surface and an impedance of the fourth acoustically reflective surface different than the impedance of the third acoustically reflective surface. The third acoustically reflective surface may comprise a lower acoustic impedance material and the fourth acoustically reflective surface may comprise a high acoustic impedance material.

Estimating the acoustic parameter may comprise estimating an acoustic impedance for the downhole fluid using a ratio of a first product of the first reflection received at the first acoustic receiver and the second reflection received at the second acoustic receiver to a second product of the second reflection received at the first acoustic receiver and the first reflection received at the second acoustic receiver. The first distance may be less than the second distance and the third distance may be less than the fourth distance.

Estimating the acoustic parameter may comprise estimating an attenuation coefficient for the downhole fluid using a ratio of a first value for a split-signal amplitude of the first reflection received at the first acoustic receiver and a second value for a split-signal amplitude of the second reflection received at the first acoustic receiver.

The apparatus may be further configured to carry out method embodiments as described herein. For example, the processor may be configured to carry out the methods described above.

Further embodiments may include a non-transitory computer-readable medium product having instructions thereon that, when executed, cause at least one processor to perform a method as described above. The non-transitory computer-readable medium product may include at least one of: (i) a ROM, (ii) an EPROM, (iii) an EEPROM, (iv) a flash memory, or (v) an optical disk.

Examples of some features of the disclosure may be summarized rather broadly herein in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIGS. 4A-4D show beam modeling resulting in accordance with embodiments of the present disclosure.

DETAILED DESCRIPTION

Figure 1:
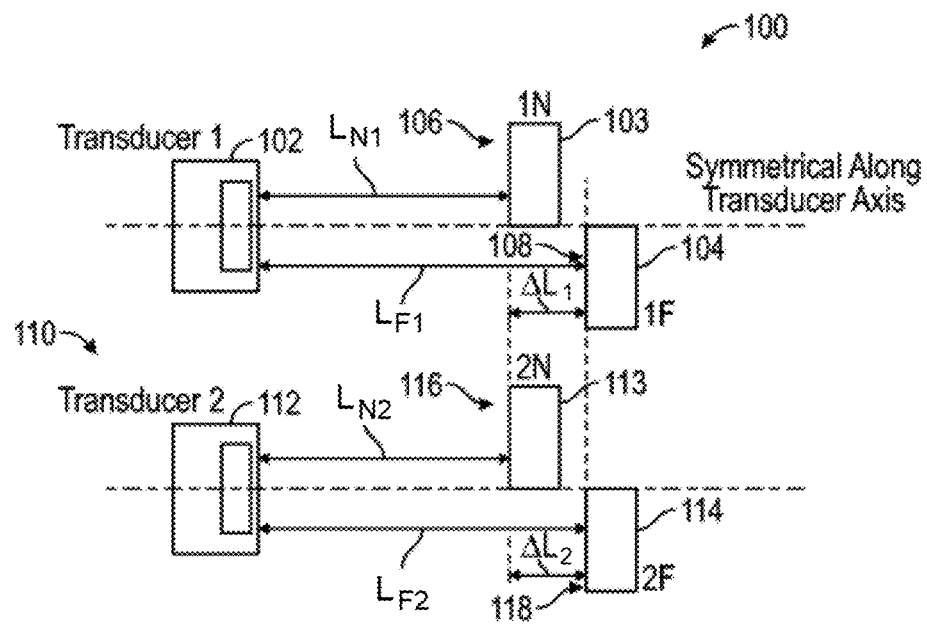
FIG. 1 shows a device in accordance with embodiments of the present disclosure.

In aspects, this disclosure relates to estimating a parameter of interest of a downhole fluid in an earth formation intersected by a borehole. The at least one parameter of interest may include, but is not limited to, one or more of: (i) sound speed of the fluid, (ii) attenuation coefficient of the fluid; and iii) acoustic impedance of the fluid.

Various techniques have been used to analyze downhole fluids. Such techniques may include the use of instruments for obtaining information relating to a parameter of interest in conjunction with sample chambers storing the sampled fluid for analysis or sample chambers allowing the fluid to pass through (continuously, or as directed by a flow control) for sampling, or as mounted on an exterior of a tool body of a downhole tool. Example systems may use a signal generator and sensor (which may be combined; e.g., a transducer) for determining acoustic impedance. In the well-known time of flight method, the sound speed, c, of a fluid may be determined by dividing the travel time of the signal through the fluid by the distance the signal traveled through the fluid.

Currently, both LWD and wireline tools exist which may estimate mud acoustic velocity from empirical formulas based on downhole mud type, weight, temperature, pressure, mud salinity, etc., for standoff and caliper measurements. However, the inherent limitations of these types of methods result in relatively large errors (up to +/−20 percent). This may stem from the modeling inaccuracies of empirical formulas from limited data bases, lack of accounting for cuttings and gas, and so on. Fluid acoustic impedance and attenuation properties influence signal strength. Accurate measurement of the two properties is often difficult due to the combined and confounding effects of acoustic impedance mismatch and acoustic attenuation on reducing the amplitudes of the returned echoes. Signal strength varies with transducer sensitivity, which often drifts with temperature and pressure downhole. Moreover, when multiple transducers are used (even those of the same design and production run), variations in response of up to 15 percent or more may occur. Resonant plate methods measure acoustic speed in drilling fluid using one fixed metal reflector located in front of a transducer. See, for example, U.S. Pat. No. 6,957,700. Wireline rotational transducer assemblies for mud velocity calibration and impedance measurement are known. These assemblies estimate acoustic impedance in the fluid by analyzing measured reverberation signals and comparing to theoretical estimates. These methods cannot measure fluid attenuation coefficients, and need constant recalibration for sound velocity measurement. Methods known in the art are unable to resolve measurements for impedance independent of transducer similarity.

In typical reflective measurements of acoustic signals in a fluid, the reflected signal strength from each target is dependent upon not only the attenuation in the fluid, but also the acoustic impedance mismatch of the fluid and the target materials used. The signal amplitudes may also be affected by drive voltage, transducer sensitivity variation due to individual units and downhole conditions (temperature, pressure, etc.). The signal amplitudes may also be affected by transducer beam geometric and diffraction effects. For reliable and accurate fluid property measurement, these effects must be calibrated or corrected. A robust and accurate method for determining the sound velocity, acoustic impedance, and attenuation coefficient in borehole fluid in situ, while providing self-calibration of transducer responses, would be desirable.

The present application relates to methods of determining an acoustic parameter of a downhole fluid using an acoustic assembly comprising a plurality of acoustic reflectors each having at least one acoustically reflective surface at least partially immersed in the downhole fluid. Acoustic transducers are positioned to be at least partially immersed in the fluid, and configured to provide acoustic pulses to the fluid that propagate within the fluid to generate a plurality of acoustic pulse reflections from the reflectors. Although two transducers are shown, more transducers (and/or reflectors) may be used.

Techniques described herein are applicable for LWD, open-hole and cased-hole wire-line applications (e.g., casing and cement bond evaluation), standoff/caliper applications for nuclear density and neutron porosity, open-hole and cased-hole imaging, sonic logging applications, and so on. For cased-hole applications, the fluid acoustic sound velocity may be employed in determining casing standoff (inner diameter), casing wall thickness, and casing wear estimates. As a key model input parameter, more accurate fluid acoustic impedance improves the accuracy of cement acoustic impedance inversion using model-based iteration. Example applications for fluid acoustic properties may include borehole fluid identification and characterization, formation fluid sampling analysis, drilling dynamic event monitoring (gas bubbles, kicks, cuttings, etc.), and borehole washout and fracture imaging. See for example, Hayman et al, High-Resolution Cementation and Corrosion Imaging by Ultrasound, and U.S. patent application 2008/0189041 to Froelich.

FIGS. 1-3C show devices in accordance with embodiments of the present disclosure. Devices may be employed in carrying out the methods of the present disclosure. Aspects may include determining an acoustic parameter of a downhole fluid using an acoustic assembly comprising a plurality of acoustic reflectors each having at least one acoustically reflective surface at least partially immersed in the downhole fluid. Thus, devices may include this assembly or may be part of a system including the assembly. Methods may include transmitting a plurality of pulses; measuring values for at least one wave property measured for reflections of the plurality of pulses received at at least one acoustic receiver, and estimating the acoustic parameter using the values. The plurality of pulses and the reflections may each be transmitted through the downhole fluid.

The measured values may include a first value for a first reflection traveling a first known distance from a first acoustically reflective surface having a first known acoustic impedance; a second value for a second reflection traveling a second known distance substantially the same as the first known distance from a second acoustically reflective surface having a second known acoustic impedance substantially different than the first acoustic impedance; and a third value for a third reflection traveling a third known distance substantially different from each of the first distance and the second distance from a third acoustically reflective surface having a third known acoustic impedance substantially the same as the second acoustic impedance. The unique dissimilarities in the wave properties of reflections from these three reflectors allow for the determination of acoustic fluid properties, including fluid impedance.

Figure 2:
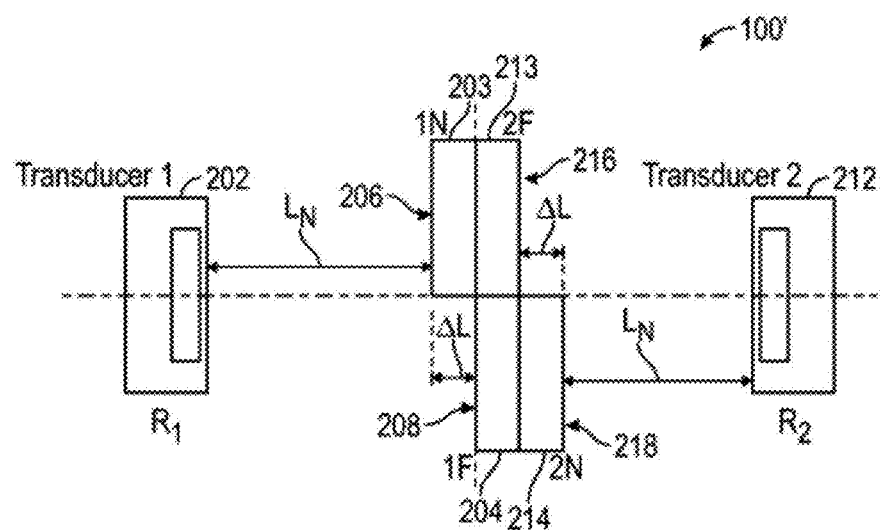
FIG. 2 shows another device in accordance with embodiments of the present disclosure.

FIGS. 1 & 2 disclose a static assembly which may include no moving parts. Methods employing devices similar to FIGS. 1 & 2 may include estimating the acoustic parameter using a value for at least one wave property measured for each of: a first reflection received at a first acoustic receiver (R1) of a first pulse from a first acoustically reflective surface located a first distance from the first acoustic receiver; a second reflection received at the first acoustic receiver (R1) of the first pulse from a second acoustically reflective surface located a second distance from the first acoustic receiver different than the first distance; a first reflection received at a second acoustic receiver (R2) of a second pulse from a third acoustically reflective surface located a third distance from the second acoustic receiver; and a second reflection received at the second acoustic receiver (R2) of the second pulse from a fourth acoustically reflective surface located a fourth distance from the second acoustic receiver different than the third distance. The first pulse, the first reflection of the first pulse, the second reflection of the first pulse, the second pulse, the first reflection of the second pulse, and the second reflection of the second pulse are each transmitted through the downhole fluid. Wave properties may include travel time and amplitude.

For example, methods may include using two transducers and two pairs of symmetrically positioned reflectors having an offset distance for accurate measurement of acoustic velocity, impedance, and attenuation coefficient in borehole fluid under downhole conditions. The acoustic impedance in the fluid is determined from the reflected signal amplitudes of the first and the second reflector pair of the different impedance materials. The method is self-calibrating. That is, it self-corrects for the transducer sensitivity variation, beam spreading, and fluid attenuation effects in the acoustic impedance determination.

In FIG. 1, the device 100 comprises an acoustic assembly 110. The acoustic assembly 110 comprises two ultrasound transducers 102, 112, and each transducer is paired with two reflectors. The reflectors are configured to return the signal to the corresponding transducer for measurement, although separate transmitting and receiving transducers could also be employed. The transducers generate information responsive to the returning acoustic reflection. The acoustic assembly 110 is configured such that a pulse from each transducer will reflect from an acoustically reflective surface of each reflector and return for detection at the transducer. It may be beneficial in some applications for the transducers to be of the same design and configuration. The transducers and reflectors, as well as the volume between, are immersed in the downhole fluid. The assembly may be one large fluid cell, or may be separated with each transducer in a separate fluid cell, as long as the fluid is substantially the same in each cell.

FIG. 2 shows another device in accordance with embodiments of the present disclosure. The device 100' comprises an acoustic assembly 110'. The acoustic assembly 110' comprises two ultrasound transducers 202, 212, and each transducer is paired with two acoustically reflecting surfaces. However, the transducers 202, 212 are positioned to operate in opposite directions, at normal incident angle, each facing symmetrically located dual reflectors with standoff $L_N$ and offset $\Delta L$.

Returning to FIG. 1, reflector 103 has an acoustically reflective surface 106, and reflector 104 has an acoustically reflective surface 108. The reflectors 103, 104 are generally positioned some distance from the transducer 102 and adjacent the operative axis of the transducer 102. The reflectors 103, 104 are positioned such that reflective surfaces 106, 108 face the transducer 102. The reflective surfaces 106, 108 are positioned at staggered standoff distance from the transducer, such that surface 106 is a first distance ($L_{N1}$) from the transducer 102 and surface 108 is a second distance (LF1) from the transducer 102 greater than the first distance by an offset, $\Delta L_1$. Thus, reflector 103 may be referred to as the near reflector for transducer 102 and reflector 104 may be referred to as the far reflector.

Similarly, for the second transducer 112, reflector 113 has an acoustically reflective surface 116, and reflector 114 has an acoustically reflective surface 118. The reflectors 113, 114 are generally positioned some distance from the transducer 112 and adjacent the operative axis of the transducer 112. The reflectors 113, 114 are positioned such that reflective surfaces 116, 118 face the transducer 112. The reflective surfaces 116, 118 are positioned at staggered standoff distances from the transducer, such that surface 116 is a first distance ($L_{N2}$) from the transducer 112 and surface 118 is a second distance ($L_{F2}$) from the transducer 112 greater than the first distance by an offset, $\Delta L_2$. Thus, reflector 113 may be referred to as the near reflector for transducer 112 and reflector 114 may be referred to as the far reflector. In some embodiments, $L_{N1}$ may be equal to $L_{N2}$ and/or $L_{F1}$ may be equal to $L_{F2}$.

The first transducer 102 emits ultrasonic waves (e.g., at a frequency of 250-350 kHz), at normal incidence, to the first two reflectors 103, 104 (1N, 1F) which are of the same high-impedance material and placed symmetrically relative to the transducer beam center axis with an offset distance. Short-pulse, wide band transmitters may be beneficial. The reflected acoustic waveform is received by the first transducer, and the echoes from the near reflector 103 and the far reflector 104 are detected, and their signal amplitudes ($A_{1N}$, $A_{1F}$) and their travel times, are measured. Near and far target separation may be needed for good echo separation. Reflector thickness may be chosen to limit resonance excited by the pulse. Some implementations may include an axial target separation gap for one or both targets.

The second transducer 112 emits ultrasonic waves, at normal incidence, to the second two reflector pair 113, 114 (2N, 2F) that are symmetrically placed relative to the transducer beam center axis with an offset distance. For the second pair the near reflector 113 (2N) may be a lower acoustic impedance material while the far target 114 (2F) is the same high-impedance material as the first reflector pair 103, 104. Similarly, the reflected waveform from the second transducer is received, and the echoes from the near reflector 113 and the far reflector 114 are detected, and their signal amplitudes ($A_{2N}$, $A_{2F}$) and their travel times, are measured.

A downhole signal processor is used to multiply and normalize amplitude values, which is used to calculate the fluid acoustic impedance as shown below. The fluid attenuation coefficient can be determined from the ratio of the signal amplitudes from the near 1N and the far reflector 1F of the high-impedance pair. The sound velocity maybe determined from the difference in the signal travel times and the constant offset.

The ultrasonic wave emitted from each transducer will be attenuated in the fluid, and partially reflected from the first near target, and further attenuated and partially reflected from the second target. The targets may be positioned symmetrically and at a normal angle to the transducer center axis. The acoustic main beam coverage for the near and for the far reflector may be slightly different from beam spreading for each. On the received waveform the reflected signals will separate into two signals given the offset of the two reflectors—one from the near reflector and the other from the far reflector.

The proposed method of using dual-transducer, dual-target with offset, allows effective self-calibration of the above effects, as shown below. Also, the proposed method uses fixed reflectors and no movable parts. Moreover, the contributions from the fluid attenuation and from the impedance mismatch at fluid-target interface are essentially separated from each other, using the suggested method.

Referring to FIG. 1, the echo amplitudes from the near and the far reflectors of the first pair, due to the first transducer, $A_{1N}$, $A_{1F}$, and the echo amplitudes from the near and the far reflector of the second pair, due to the second transducer, $A_{2N}$, $A_{2F}$, are given below:

$$A_{1N} = P_{01} B_{1N} G_{1N} e^{-2\alpha L_N} R_{m,1N} \quad (1)$$

$$A_{1F} = P_{01} B_{1F} G_{1F} e^{-2\alpha L_F} R_{m,1F} \quad (2)$$

$$A_{2N}=P_{02}B_{2N}G_{2N}e^{-2\alpha L_N}R_{m,2N} \quad (3)$$

$$A_{2F}=P_{02}B_{2F}G_{2F}e^{-2\alpha L_F}R_{m,2F} \quad (4)$$

In the above, $P_{01}$ and $P_{02}$ are the transmitted signal amplitudes (sensitivity factors) of transducer 102 and transducer 112; a is the fluid attenuation coefficient. The two transducers are of the same design and configurations, and substantially similar frequency and pulse-echo signal characteristics. $B_{1N}$, $B_{1F}$, $B_{2N}$, and $B_{2F}$ are the beam spreading factors, while $G_{1N}$, $G_{1F}$, $G_{2N}$, $G_{2F}$, are the geometric factors, of the near and the far targets for the transducers. $R_{m,1N}$, $R_{m,1F}$, $R_{m,2N}$, and $R_{m,2F}$ are the acoustic pressure amplitude reflection coefficients at the near and the far reflectors for transducer 102 and transducer 112, respectively. Because of the same design and configurations of the two transducers, and of the symmetric positioning of the near and far targets relative to the transducer center beam axis, the beam spreading factors $B_{1N}=B_{2N}$, $B_{1F}=B_{2F}$. Also due to the symmetry, the beam geometric factors $G_{1N}=G_{2N}$; $G_{1F}=G_{2F}$.

The two reflectors corresponding to the first transmitter may be of the same material, preferably a high acoustic impedance material. High-impedance materials are materials with an acoustic impedance of 25 MRayls or more. In some applications, use of a strong reflector is desirable. Strong reflectors are high-impedance materials with an acoustic impedance of 40 MRayls or more, such as stainless steel, carbon steel, Inconel, titanium, or tungsten (having acoustic impedances ranging from 46 to 109 MRayls). As shown, this allows calculation of the echo travel time delay and ratio of echo amplitude, enabling the calculation of sound speed in the fluid (c) and attenuation coefficient (a). However, the reflectors corresponding to the first transmitter may also be composed of different materials having an impedance contrast.

In the second cell the near reflector preferably may be a lower acoustic impedance (relatively acoustically damping) material. Lower impedance materials are materials with an acoustic impedance of 15 MRayls or less. In some applications, use of a weak reflector is desirable. Weak reflectors are lower impedance materials with an acoustic impedance of 5-10 MRayls, such as thermoplastics, epoxy, composite, or magnesium (having acoustic impedances ranging from 6 to 10 MRayls). The far reflector is of the same high-impedance material as the first cell. This allows direct calculation of fluid acoustic impedance ($Z_m$) from echo amplitude ratios, as shown below. The near or the far target of the second pair, does not have to be the same material as either the near or the far of the first pair, but may be.

$$R_{m,1N} = R_{m,1F} = R_{m,2F} = \frac{Z_{2F} - Z_m}{Z_{2F} + Z_m} \quad (5)$$

$$R_{m,2N} = \frac{Z_{2N} - Z_m}{Z_{2N} + Z_m} \quad (6)$$

where, $Z_{2N}$ and $Z_{2F}$ are the acoustic impedances of the near and the far reflector, and $Z_m$ is the acoustic impedance of the borehole fluid to be determined. Re-arranging the equations (1)-(4), and using the cross-product ratio $(A_{1N} A_{2F})/(A_{1F} A_{2N})$ of the measured signal amplitudes, the transducer sensitivity factors, the beam spreading factors, the geometric factors, and the attenuation terms are all cancelled out, thus resulting in the equation:

$$\frac{A_{1N}A_{2F}}{A_{2N}A_{1F}} = \left(\frac{Z_{2F} - Z_m}{Z_{2F} + Z_m}\right) / \left(\frac{Z_{2N} - Z_m}{Z_{2N} + Z_m}\right) \quad (7)$$

Defining $C=(A_{1N}A_{2F})/(A_{1F}A_{2N})$, the fluid impedance $Z_m$ can be directly solved from the measured echo amplitude ratio C, the known acoustic impedances of the near target (low-impedance), $Z_{2N}$, and of the far (high-impedance) reflectors, $Z_{2F}$, (unit in MRayls).

$$Z_m = \frac{-b + \sqrt{b^2 - 4ac}}{2a} \quad (8)$$

where $a = 1 - C$ $b = (1 + C)(Z_{2N} - Z_{2F})$ $c = -(1 - C)Z_{2N}Z_{2F}$.

Equation (7) and (8) may be replaced with the more general formulation, as shown below, if the first pair of reflectors are not made of the same material.

Signal processing and steps may be used, i.e., signal gating, FFT processing, enveloping (or rectified) signal conversion from raw signal, noise filtering, detecting travel time and peaks for the near and the far targets, and calculating fluid acoustic impedance, sound velocity, and attenuation coefficient, may be achieved using a downhole controller and processor.

Use of wideband transducer (e.g., 6-dB bandwidth 60% or higher, at center frequency 250 kHz) capable of generating and receiving short-pulse broad-band signal may be preferable. Symmetrical positioning of the near and the far targets (the two reflectors are of equal area), relative to the transducer beam axis, may be preferred for substantially equal beam coverage. In some implementations, it is desirable to use reflectors with a diameter approximately 20 percent larger than the transducer diameter.

FIGS. 4A-4D show beam modeling resulting in accordance with embodiments of the present disclosure. The modeling is based on a 250-kHz rectangular transducer of 34 mm tall and 12 mm wide. For this transducer, results showed that the dominant transmit-receive pressure field area, at 40 mm standoff, is about 30 mm in elevation and about 30 mm in the lateral direction. Therefore, for that transducer, each target reflector is preferably 5-10 mm taller and about 20-30 mm wider than those of the transducer. At 250 kHz (65% 6-dB bandwidth), a suitable standoff would be 1.0-2.0 inches for the typical water-based and oil-based drilling fluid with attenuation coefficients up to 5-6 dB/cm at 250 kHz. The preferred offset between the two reflectors may be from 0.50 to 1.0 inches. To minimize the reverberation ringing of the near reflector and its interference to the far reflector signal, the length of the high-impedance reflectors, for example, stainless steel, may be less than 0.35 inches, or thicker than 0.70 inches. The length of the low-impedance reflector may be 0.5-1.0 inches long. The near and the far reflectors may be separated apart, or may be a thin joint filled with damping materials to reduce the lateral noise and boundary effects.

The attenuation coefficient in the fluid may be determined from the measured signal amplitudes from the near and the far reflectors and the near-far reflector offset ΔL, neglecting the beam spreading and geometric effects (in unit of dB/cm):

$$\alpha = \frac{10}{\Delta L} \log_{10} \frac{A_{1N}}{A_{1F}} \quad (9)$$

Alternatively, to account for frequency effect, the mud attenuation at a frequency can be calculated using (9), from the FFT spectrum magnitudes at the frequency of the near and far reflector signals.

For more accurate fluid attenuation measurement, the beam and geometric effects can be pre-calibrated, i.e., in water, using the first transducer cell of the two same high-impedance reflectors. Then the fluid attenuation coefficient may be calculated from the signal amplitude ratio in an unknown fluid, and from the signal ratio measured in the water reference (in unit dB/cm):

$$\alpha = \frac{10}{\Delta L} \log_{10} \frac{(A_{1N}/A_{1F})_{fluid}}{(A_{1F}/A_{1F})_{water}} \quad (10)$$

The sound speed in the fluid, c, may be directly calculated from $\Delta T$, the difference in time delay of the near and the far reflector signals, and $\Delta L$, the known offset, $c = 2\Delta L/\Delta T$, and is thus self-corrected for electronic delay variations and transducer internal travel time variations. The waveform may be filtered and rectified. The near and the far reflection signals may be detected using a peak (or envelope peak) search. To increase the robustness and accuracy, the far reflector signal may be delay gated, and peak (or envelope peak) detection may be used to bypass the noise and near or tail interference from the near reflection signal.

Additionally, as long as the material properties (e.g., acoustic impedance) of the four targets (the near and the far reflectors associated with the first transmitter; and the near and the far reflectors associated with the second transmitter), are known (or pre-determined in lab under high temperature and high pressure conditions), the fluid impedance $Z_m$ can be solved from measured amplitude ratio C, and a reflection coefficient of each target, in a more general equation:

$$C = [A_{1N} * A_{2F}/(A_{2N} * A_{1F})] = (R_{m,1N} * R_{m,2F})/(R_{m,2N} * R_{m,1F}) \quad (11)$$

where $R_{m1,N}$, $R_{m,1F}$, $R_{m,2N}$, and $R_{m,2F}$ are the pressure amplitude reflection coefficients of the near of the first pair, the far of the first pair, the near of the second pair, and the far of the second pair, respectively. Proper use of this equation may involve canceling the geometric and beam spreading factors. To satisfy this condition, the two transducers are preferably of the same design, having approximately similar size and operating at similar frequencies (although, the sensitivity may be different), and using similar standoffs for the two near targets and for the two far targets.

Returning to FIG. 2, the device 100' comprises an acoustic assembly 110'. The acoustic assembly 110' comprises two ultrasound transducers 202, 212, and each transducer is paired with two acoustically reflecting surfaces. However, the transducers 202, 212 are positioned to operate in opposite directions, at normal incident angle, each facing symmetrically located dual reflectors with standoff $L_N$ and offset $\Delta L$. One of the near reflectors (2N) may be a lower impedance material and the other three reflectors are of same high-impedance material. To mitigate effects of signal attenuation, one of the near reflectors (2N) may be a low-impedance material. Alternatively, the far reflector (2F) may be a low-impedance material while the near target (2N) is the same high-impedance material as 1N and 1F.

Reflector 203 has an acoustically reflective surface 206, and reflector 204 has an acoustically reflective surface 208. The reflectors 203, 204 are generally positioned some distance from the transducer 202 and adjacent the operative axis of the transducer 202. The reflectors 203, 204 are positioned such that reflective surfaces 206, 208 face the transducer 202. The reflective surfaces 206, 208 are positioned at staggered standoff distance from the transducer, such that surface 106 is a first distance ($L_{N1}$) from the transducer 102 and surface 108 is a second distance ($L_{F1}$) from the transducer 102 greater than the first distance by an offset, $\Delta L_1$. Thus, reflector 103 may be referred to as the near reflector for transducer 102 and reflector 104 may be referred to as the far reflector.

Similarly, for the second transducer 212, reflector 213 has an acoustically reflective surface 216, and reflector 214 has an acoustically reflective surface 218. The reflectors 213, 214 are generally positioned some distance from the transducer 212 and adjacent the operative axis of the transducer 212. The reflectors 213, 214 are positioned such that reflective surfaces 216, 218 face the transducer 212. The reflective surfaces 216, 218 are positioned at staggered standoff distances from the transducer, such that surface 216 is a first distance ($L_{N2}$) from the transducer 212 and surface 218 is a second distance ($L_{F2}$) from the transducer 212 greater than the first distance by an offset, $\Delta L_2$. Thus, reflector 213 may be referred to as the near reflector for transducer 212 and reflector 214 may be referred to as the far reflector. $L_{N1}$ may be equal to $L_{N2}$ and/or $L_{F1}$ may be equal to $L_{F2}$. In alternative embodiments, adjacent reflectors formed of the same material (e.g., 203, 213) may be implemented as a single reflector with increased dimensions having two acoustically reflecting surfaces.

Figure 3C:
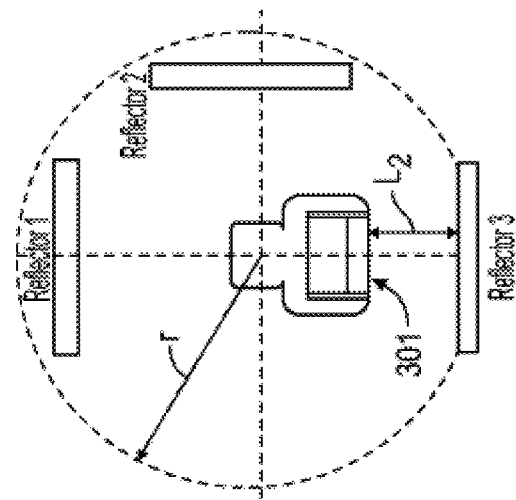
FIGS. 3A-3C show another device in accordance with embodiments of the present disclosure.
Figure 3B:
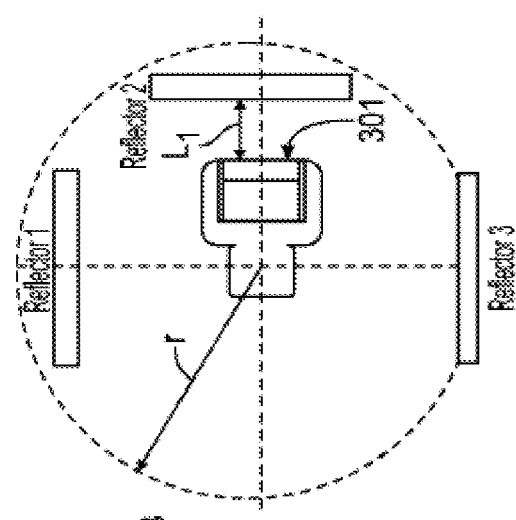
Figure 3A:
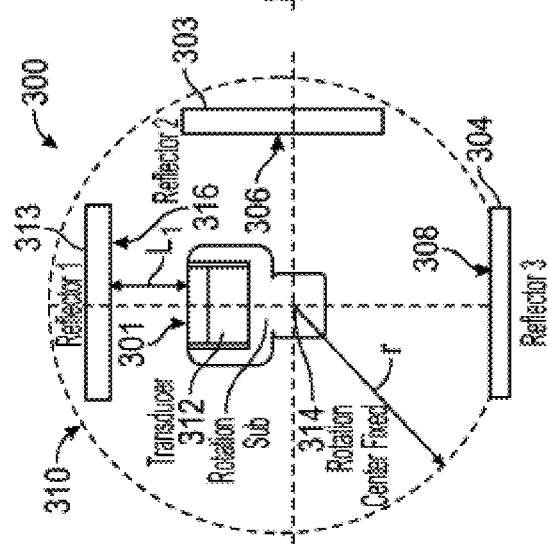

FIGS. 3A-3C show another device in accordance with embodiments of the present disclosure. The device 300 comprises an acoustic assembly 310 with a rotating transducer 312, so that the transducer and the system of reflectors rotate with respect to one another. For example, transducer 312 may be mounted on a rotating transducer sub or the like. The transducer 312 acts as both transmitter and receiver, although other embodiments may feature other types of combined transmitter/receiver, a separate transmitter and receiver, multiple transmitters and/or receivers, multiple transducers, and so on. The acoustic pulse may be ultrasonic. Alternative embodiments may include more or fewer reflectors. The transducer 312 is configured to rotate about an axis of the assembly 314, and when oriented toward each respective reflector, transmit an acoustic pulse and receive a reflection of that pulse from the particular reflector.

Each of the reflectors 303, 304, 313 includes an acoustically reflective surface 306, 308, 316, respectively. The first acoustically reflective surface 316, the second acoustically reflective surface 306, and the third acoustically reflective surface 308 are azimuthally distributed about the axis, such that each of the first reflection, the second reflection, and the third reflection each return to the acoustic receiver from a different azimuth with respect to the axis 314. The reflectors may be circumferentially positioned (e.g., mounted)—that is, positioned proximate a circumference of the tool cross-section.

The reflectors 303, 304, 313 are generally positioned some distance from the face 301 of the transducer 312 during reception (and/or transmission) of the reflection. Assembly 310 is configured such that reflective surfaces 306, 308, 316, respectively return a reflection of the respective transmitted acoustic pulse to the transducer face 301.

FIGS. 3A-3C show the transducer 312 in three different orientations corresponding to three different points of rotation. The transducer rotates from the first orientation (facing a low-impedance reflector) in FIG. 3A to face (at approximately normal incidence) a high-impedance reflector (at the same standoff as the first reflector). From the signal amplitudes of the low- and high-impedance reflectors, the fluid impedance can be determined. Additionally, the transducer may rotate to a third orientation and face (at approximately normal incidence) a third reflector, which is of the same material as the second one, but at a different standoff. From the signal amplitudes and time delays of the second and the third reflector, fluid attenuation coefficient and velocity may be determined.

At the first position (FIG. 3A) the signal amplitude from the first reflection may be expressed as:

$$A_1 = P_1 B_1 e^{-2L_1\alpha}\left(\frac{Z_1 - Z_m}{Z_1 + Z_m}\right). \quad (12)$$

At the second position (FIG. 3B) the signal amplitude from the second reflection may be expressed as:

$$A_2 = P_1 B_1 e^{-2L_1\alpha}\left(\frac{Z_2 - Z_m}{Z_2 + Z_m}\right). \quad (13)$$

Fluid impedance $Z_m$, is solved from the ratio of signal Amplitudes, $C=A_1/A_2$, and $Z_1$ and $Z_2$, cancelling transducer sensitivity factor $P_{01}$, beam spreading factor $B_1$, and attenuation factor $e^{-2L_1\alpha}$, $$Z_m = \frac{-b' + \sqrt{b'^2 - 4a'c'}}{2a'}, \quad (14)$$

Where, $a' = 1 - C$ $b' = (Z_2 - Z_1)(1 + C)$ $c' = -(1 - C)Z_1 Z_2$

At the first position (FIG. 3A) the signal amplitude from the first reflection may be expressed as:

$$A_3 = P_1 B_3 e^{-2L_2\alpha}\left(\frac{Z_2 - Z_m}{Z_2 + Z_m}\right). \quad (15)$$

Fluid attenuation is given approximately (in dB/cm, L in cm), assuming $B_1 \approx B_3$, $$\alpha = \frac{10}{L_2 - L_1}\log_{10}\left(\frac{A_2}{A_3}\right). \quad (16)$$

Fluid sound velocity from echo travel times from reflector 2 and 3, $c=(L_2-L_1)/[2(T_3-T_2)]$.

In other implementations, only two reflectors may be used. Using reflectors mounted at the same radial distance to the transducer and at two azimuthal positions, if the first reflector is made of a material with a known high impedance and the second reflector is made of a material with a known low impedance, the fluid impedance may be directly solved from the ratio of the received signal amplitudes of the two reflectors. The effects of both the mud attenuation effect (at the same distance) and transducer sensitivity (same transducer used) are canceled. Using only two azimuthally mounted reflectors of the same high impedance material with an axial offset, mud velocity and attenuation may be directly determined.

Techniques of the present disclosure display several advantages. Accurate in-situ measurement of acoustic velocity, acoustic impedance, and attenuation coefficient of downhole fluids may be achieved by using at least one downhole processor for detecting and analyzing travel times and amplitudes of reflections from reflectors having properties with the advantageous relationships as presented in the disclosure.

With respect to some embodiments, methods enable calibrated, in-situ determination of fluid acoustic impedance from the cross-product ratio of the amplitudes of the four reflectors. Variations due to individual transducer sensitivity, temperature and pressure effects, fluid attenuation effects, and beam spreading, are effectively mitigated. More accurate sound velocity is measured using two constant offsets, as compared to a conventional one standoff method, because the internal travel time variations due to transducer variability and pressure and temperature conditions, are effectively removed.

Test results in distilled water ($Z_m$=1.49 MRayls, 25 C) are shown below for the fluid impedance inversion model. Errors in estimated impedance ($Z_m$ inverted vs. $Z_m$ known, in MRayls) using the method were less than 3 percent.

TABLE 1

| | $A_{1N}$ (V) | $A_{1F}$ (V) | $A_{2N}$ (V) | $A_{2F}$ (V) | C | $Z_{1N}$ (MRayl) | $Z_{1F}$ (MRayl) | $Z_{2N}$ (MRayl) | $Z_{2F}$ (MRayl) | $Z_m$ (Inverted) | $Z_m$ (Known) |
|---|---|---|---|---|---|---|---|---|---|---|---|
| Dual sst-Teflon, Both sides covered) | 1.444 | 1.454 | 1.4813 | 0.55 | 0.369 | 46 | 46 | 46 | 3.01 | 1.457 | 1.49 |
| Dual sst-Teflon, No covered; | 1.485 | 1.498 | 1.4893 | 0.5418 | 0.361 | 46 | 46 | 46 | 3.01 | 1.489 | 1.49 |
| Dual sst-Torlon, No covered; | 1.485 | 1.498 | 1.5109 | 0.6991 | 0.459 | 46 | 46 | 46 | 3.783 | 1.510 | 1.49 |

As a result of more accurate borehole fluid velocity, standoff and caliper measurements thus determined are more accurate than conventional one-standoff or indirect sound velocity estimate methods. The attenuation coefficient in the fluid may be measured directly from the signal (or FFT spectrum magnitude). Due to fixed near-target standoff and offset, beam spreading effects can be pre-calibrated or corrected with less error, thus allowing more accurate attenuation coefficient determination. No movable parts are used, and the mechanical setup is technically undemanding.

Figure 4A:
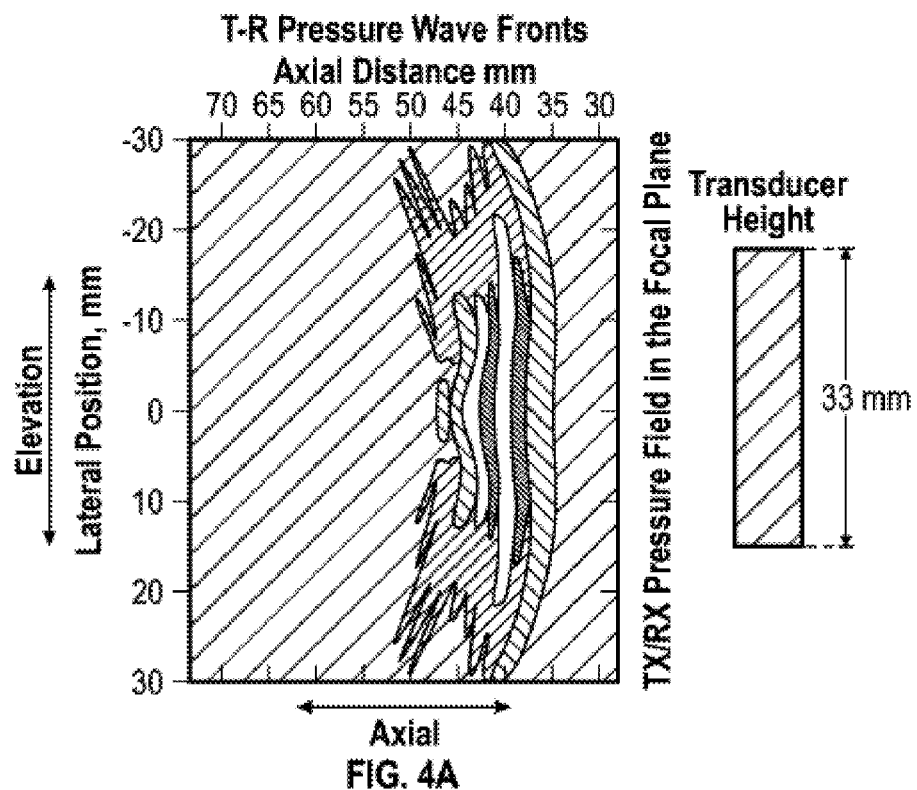
Figure 4B:
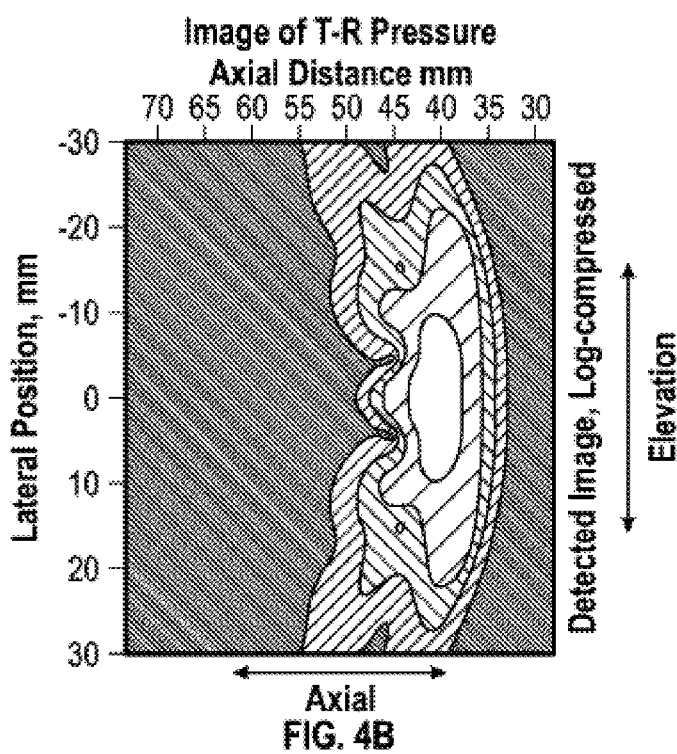
Figure 4E:
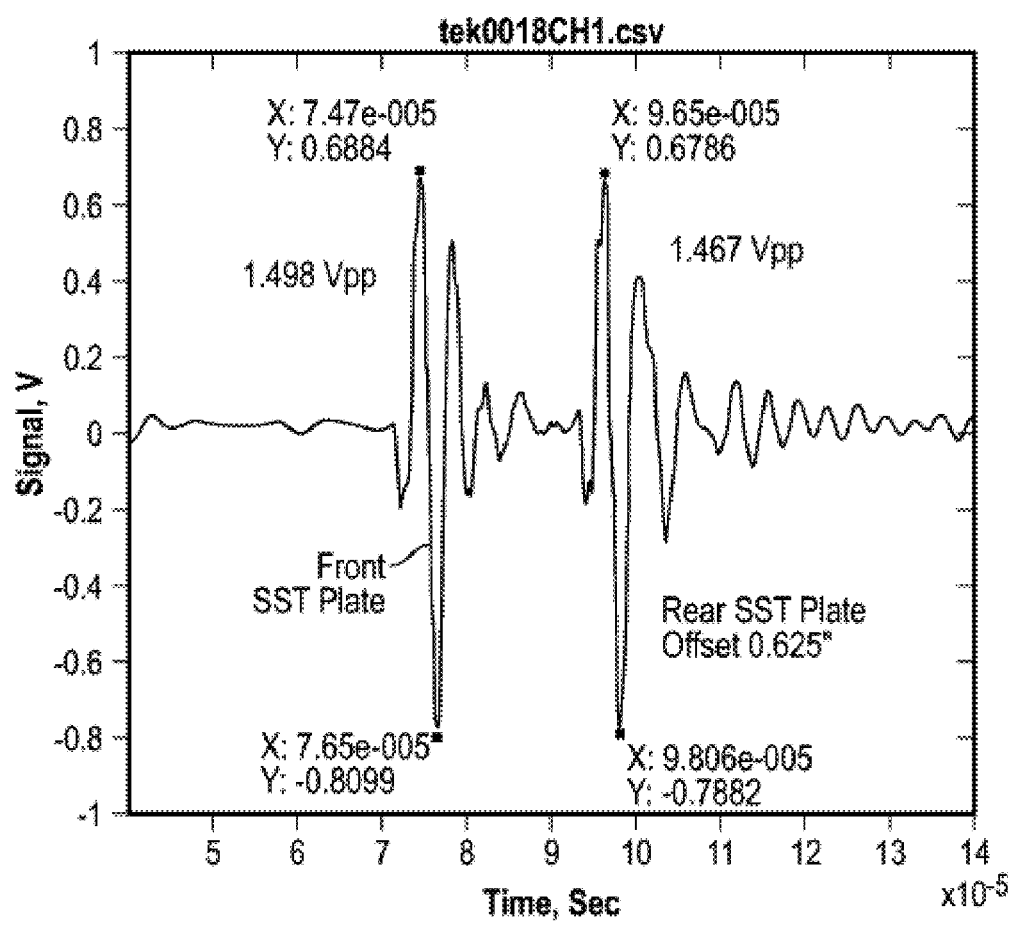
FIGS. 4E-4G show example measured waveforms illustrating results of employing techniques of the present disclosure.
Figure 4F:
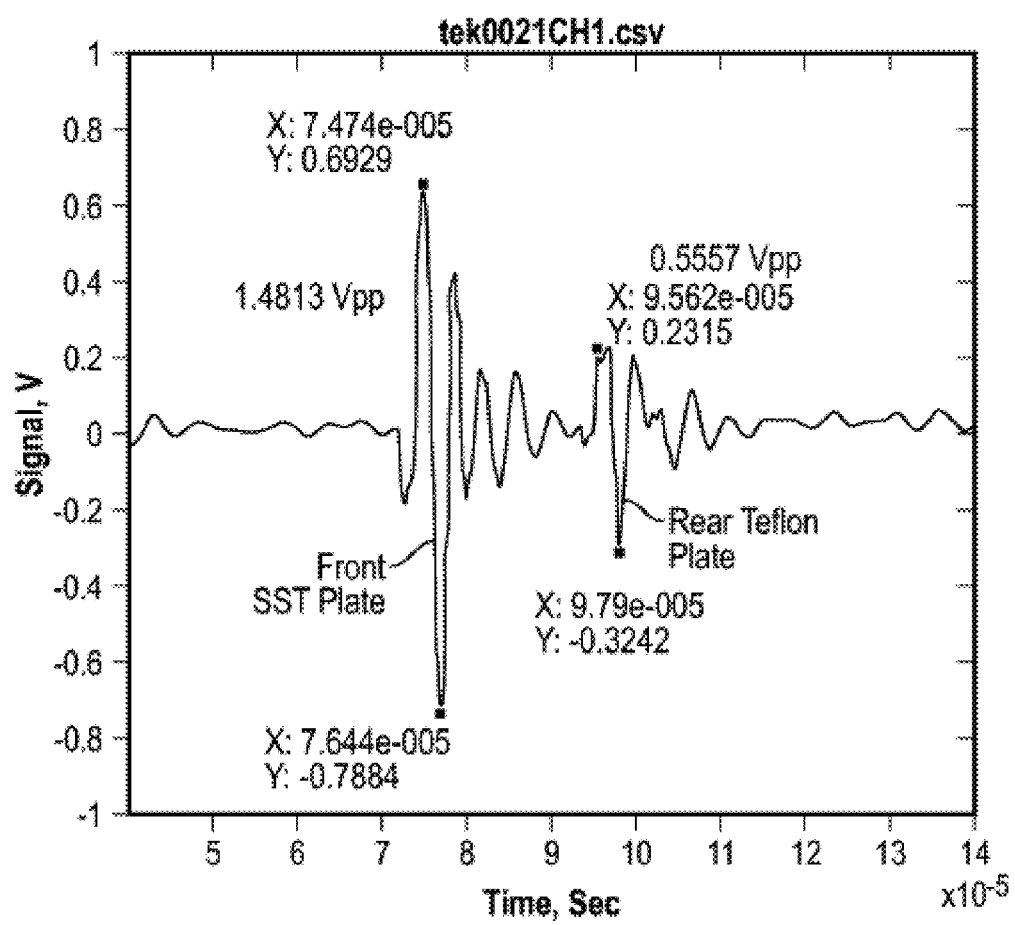
Figure 4G:
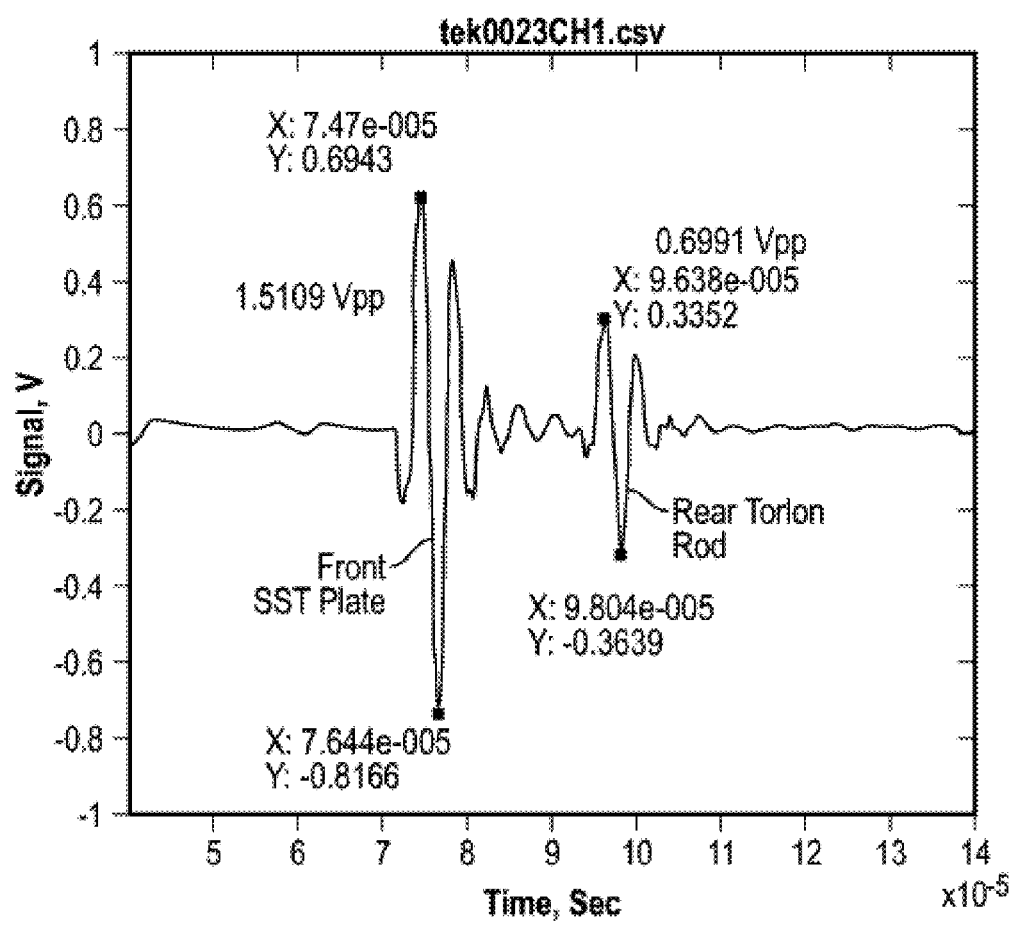

FIGS. 4E-4G show an example measured waveform illustrating results of employing techniques of the present disclosure. In FIG. 4E, the waveform shows the split echoes from two stainless steel 304 plate reflectors in distilled water. The two plates were placed symmetrically relative to the center axis of an oval 250-kHz transducer (0.75" wide and 1.625" in height). The near plate is 0.625" thickness and placed at 2.0" standoff. The far plate is 0.375" thickness with an offset of 0.625" to the near target. The echo amplitudes from the two reflectors were very close, indicating small beam spreading and boundary effects. FIG. 4F shows the split signals from near steel reflector and a far Teflon plate (acoustic impedance Z=3.01 MRayls). It is apparent that when the far stainless steel reflector is replaced with a low-impedance target, the signal amplitude is lowered.

FIG. 4G shows the signals from the near steel reflector and a far Torlon 4203 plate (Z=3.78 MRayls). The echo amplitude from Torlon is higher than from Teflon. The acoustic impedance in the fluid (distilled water) was determined from the measured echo amplitudes according to Eq. (8), with relative errors of −2.19 percent (with Teflon, up/low sides covered), −0.06 percent (using Teflon no cover) and 1.32 percent (using Torlon no cover), comparing to the known impedance of 1.49 MRayls in water.

Measurements may take place on an outer surface of the tool, such as a drill string, such that a sample chamber or other cavity is not required. Thus, properties of the downhole fluid may be determined in-situ in the borehole, so that the fluid is unchanged by sampling or transportation processes. In other embodiments, the device may be configured for use in a sample chamber. The reflection-only aspects of the present disclosure enable use in size restrictive applications and allow use of higher acoustic frequencies.

In some implementations, the disclosed embodiments may be used as part of a drilling system. An example drilling system for use in conjunction with MWD and LWT is illustrated herein.

Figure 5:
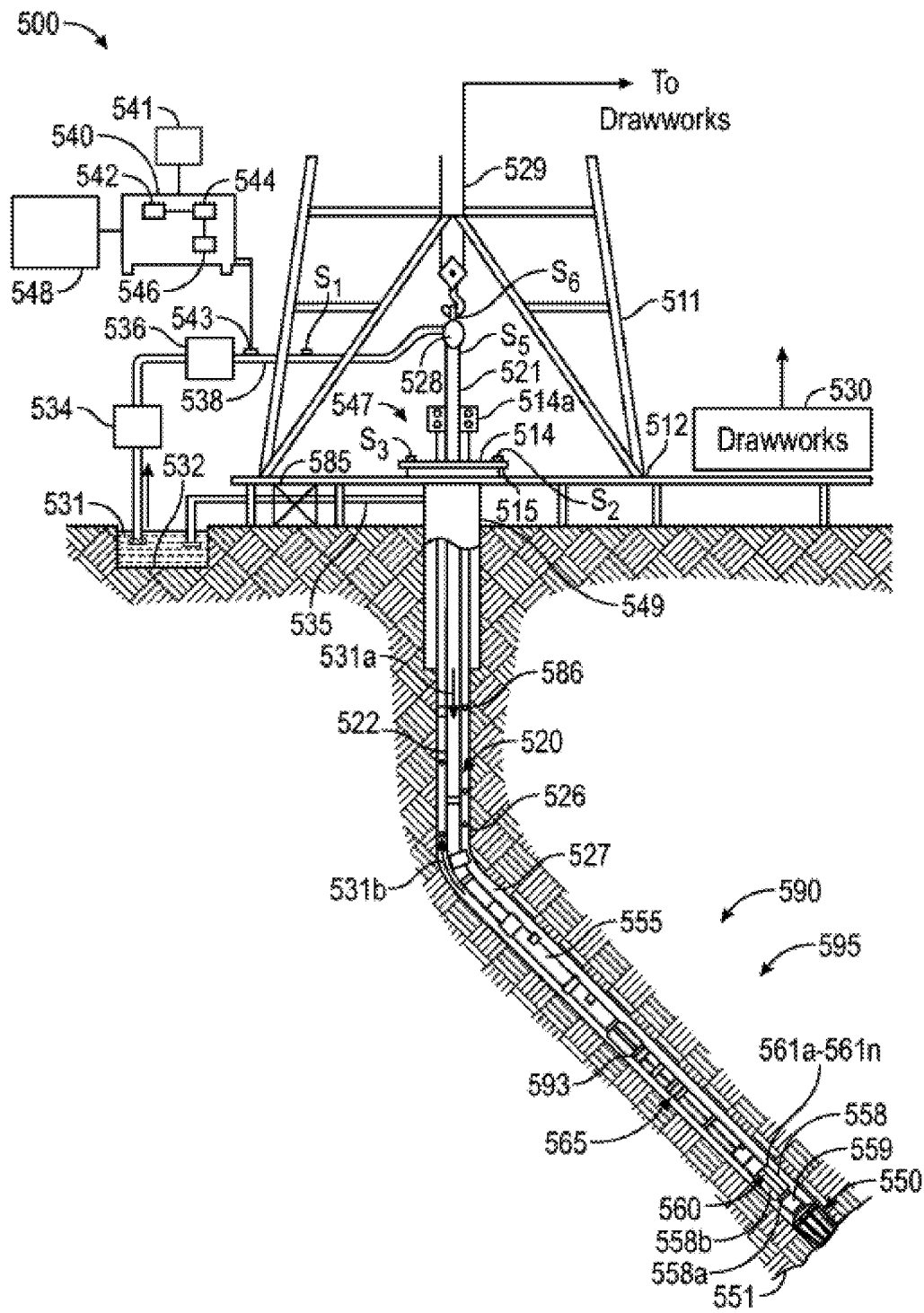
FIG. 5 is a schematic diagram of an exemplary drilling system according to one embodiment of the disclosure.

FIG. 5 is a schematic diagram of an exemplary drilling system 500 according to one embodiment of the disclosure. FIG. 5 schematically illustrates a drilling system 500 configured to acquire information for downhole fluid analysis in a borehole intersecting a formation using a test apparatus; drilling system 500 includes a drill string 520 that includes a bottomhole assembly (BHA) 590 conveyed in a borehole 526. The drilling system 500 includes a conventional derrick 511 erected on a platform or floor 512 which supports a rotary table 514 that is rotated by a prime mover, such as an electric motor (not shown), at a desired rotational speed. A tubing (such as jointed drill pipe 522), having the drilling assembly 590, attached at its bottom end extends from the surface to the bottom 551 of the borehole 526. A drill bit 550, attached to drilling assembly 590, disintegrates the geological formations when it is rotated to drill the borehole 526. The drill string 520 is coupled to a drawworks 530 via a Kelly joint 521, swivel 528 and line 529 through a pulley. Drawworks 530 is operated to control the weight on bit ("WOB"). The drill string 520 may be rotated by a top drive (not shown) instead of by the prime mover and the rotary table 514. Alternatively, a coiled-tubing may be used as the tubing 522. A tubing injector 514a may be used to convey the coiled-tubing having the drilling assembly attached to its bottom end. The operations of the drawworks 530 and the tubing injector 514a are known in the art and are thus not described in detail herein.

A suitable drilling fluid 531 (also referred to as the "mud") from a source 532 thereof, such as a mud pit, may be circulated under pressure through the drill string 520 by a mud pump 534. The drilling fluid 531 passes from the mud pump 534 into the drill string 520 via a desurger 536 and the fluid line 538. The drilling fluid 531a from the drilling tubular discharges at the borehole bottom 551 through openings in the drill bit 550. The returning drilling fluid 531b circulates uphole through the annular space 527 between the drill string 520 and the borehole 526 and returns to the mud pit 532 via a return line 535 and drill cutting screen 585 that removes the drill cuttings 586 from the returning drilling fluid 531b. A sensor S1 in line 538 provides information about the fluid flow rate. A surface torque sensor S2 and a sensor S3 associated with the drill string 520 respectively provide information about the torque and the rotational speed of the drill string 520. Tubing injection speed is determined from the sensor S5, while the sensor S6 provides the hook load of the drill string 520.

Well control system 547 is placed at the top end of the borehole 526. The well control system 547 includes a surface blow-out-preventer (BOP) stack 515 and a surface choke 549 in communication with a wellbore annulus 527. The surface choke 549 can control the flow of fluid out of the borehole 526 to provide a back pressure as needed to control the well.

In some applications, the drill bit 550 is rotated by only rotating the drill pipe 522. However, in many other applications, a downhole motor 555 (mud motor) disposed in the BHA 590 also rotates the drill bit 550. The rate of penetration (ROP) for a given BHA largely depends on the WOB or the thrust force on the drill bit 550 and its rotational speed.

A surface control unit or controller 540 receives signals from the downhole sensors and devices via a sensor 543 placed in the fluid line 538 and signals from sensors S1-S6 and other sensors used in the system 500 and processes such signals according to programmed instructions provided to the surface control unit 540. The surface control unit 540 displays desired drilling parameters and other information on a display/monitor 541 that is utilized by an operator to control the drilling operations. The surface control unit 540 may be a computer-based unit that may include a processor 542 (such as a microprocessor), a storage device 544, such as a solid-state memory, tape or hard disc, and one or more computer programs 546 in the storage device 544 that are accessible to the processor 542 for executing instructions contained in such programs. The surface control unit 540 may further communicate with a remote control unit 548. The surface control unit 540 may process data relating to the drilling operations, data from the sensors and devices on the surface, data received from downhole, and may control one or more operations of the downhole and surface devices. The data may be transmitted in analog or digital form.

The BHA 590 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 595 surrounding the BHA 590. Such sensors are generally known in the art and for convenience are generally denoted herein by numeral 565. The BHA 590 may further include a variety of other sensors and devices 559 for determining one or more properties of the BHA 590 (such as vibration, bending moment, acceleration, oscillations, whirl, stick-slip, etc.), drilling operating parameters (such as weight-on-bit, fluid flow rate, pressure, temperature, rate of penetration, azimuth, tool face, drill bit rotation, etc.).

The BHA 590 may include a steering apparatus or tool 558 for steering the drill bit 550 along a desired drilling path. In one aspect, the steering apparatus may include a steering unit 560, having a number of force application members 561a-561n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 558 having a bent sub and a first steering device 558a to orient the bent sub in the wellbore and the second steering device 558b to maintain the bent sub along a selected drilling direction. The steering unit 558, 560 may include near-bit inclinometers and magnetometers.

The drilling system 500 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 590 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 500 can include one or more downhole processors at a suitable location such as 593 on the BHA 590. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place.

While a drill string 520 is shown as a carrier (conveyance device) for sensors 565, it should be understood that embodiments of the present disclosure may be used in connection with tools conveyed via rigid (e.g. jointed tubular or coiled tubing) as well as non-rigid (e. g. wireline, slickline, e-line, etc.) conveyance systems. The drilling system 500 may include a bottomhole assembly and/or sensors and equipment for implementation of embodiments of the present disclosure on either a drill string or a wireline.

A point of novelty of the system illustrated in FIG. 5 is that the surface processor 542 and/or the downhole processor 593 are configured to perform certain methods (discussed below) that are not in the prior art. Surface processor 542 or downhole processor 593 may be configured to control components of the drilling system 500. Surface processor 542 or downhole processor 593 may be configured to control sensors described above and to estimate a parameter of interest according to methods described herein. Control of these devices, and of the various processes of the drilling system generally, may be carried out in a completely automated fashion or through interaction with personnel via notifications, graphical representations, user interfaces and the like. Reference information accessible to the processor may also be used.

More specifically, drill string 520 (or BHA 590) may include an apparatus for estimating one or more parameters of the downhole fluid. For convenience, such apparatus may be denoted by numeral 559 or 565, and may comprise device 100 or other devices or tools in accordance with embodiments of the present disclosure. In some general embodiments, surface processor 542, downhole processor 593, or other processors (e.g. remote processors) may be configured to use the apparatus to produce information indicative of the downhole fluid, such as, for example, drilling fluid. One of the processors may also be configured to estimate from the information a parameter of interest of the downhole fluid.

In some embodiments, drill string 520 may include an acoustic logging apparatus configured for evaluating the cement bond occupying the annular space between the casing and the borehole wall, as described in greater detail below with reference to FIG. 6. For convenience, such apparatus may be denoted by numeral 559 or 565. In some general embodiments, surface processor 542, downhole processor 593, or other processors (e.g. remote processors) may be configured to use the acoustic logging apparatus to produce information indicative of the properties of the cement bond.

In some embodiments, processors may include electromechanical and/or electrical circuitry configured to control one or more components of the tool apparatus. In other embodiments, processors may use algorithms and programming to receive information and control operation of the apparatus. Therefore, processors may include an information processor that is in data communication with a data storage medium and a processor memory. The data storage medium may be any standard computer data storage device, such as a USB drive, memory stick, hard disk, removable RAM, EPROMs, EAROMs, flash memories and optical disks or other commonly used memory storage system known to one of ordinary skill in the art including Internet based storage. The data storage medium may store one or more programs that when executed causes information processor to execute the disclosed method(s). Herein, "information" may include raw data, processed data, analog signals, and digital signals.

As described above, carriers such as coiled tubing, slickline, e-line, wireline, and so one may be used in connection with the techniques disclosed herein. In some embodiments, the sensor described herein may be implemented as a sampling and measuring instrument, such as, for example, one employing a probe. Specific configuration of the components with respect to one another may vary.

Figure 6:
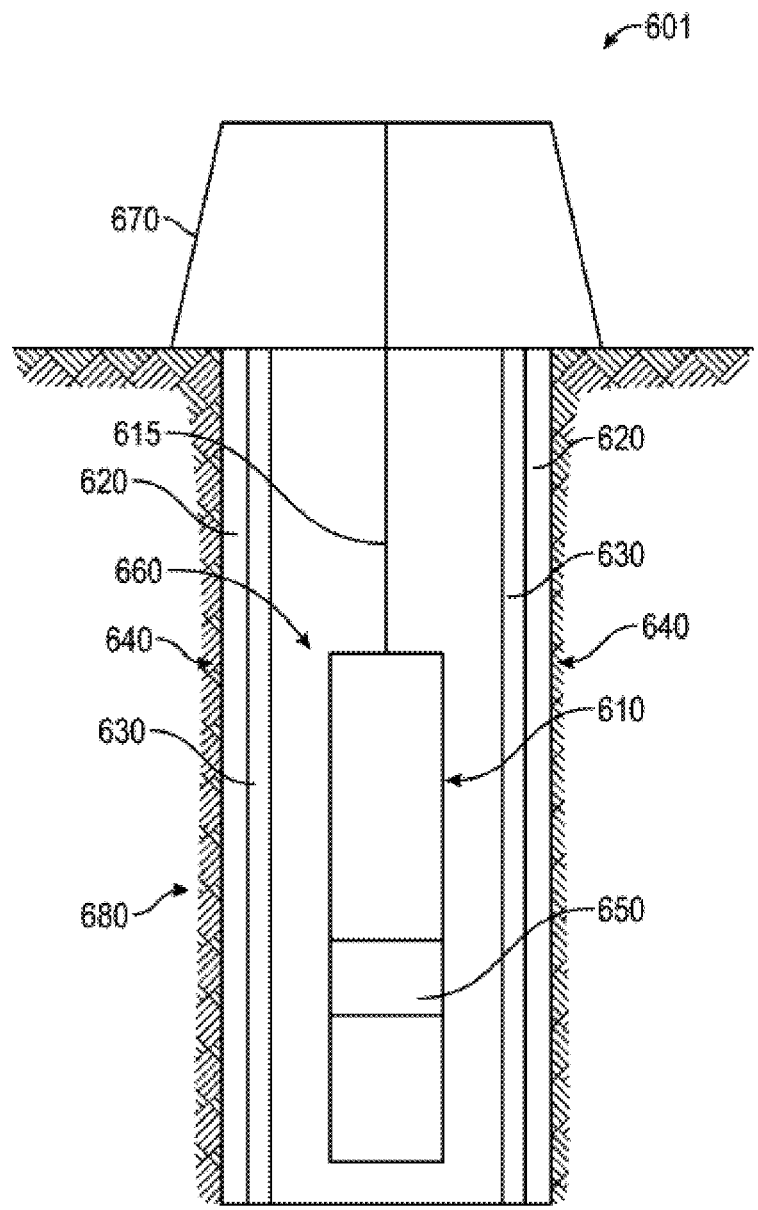
FIG. 6 illustrates an acoustic logging tool in accordance with embodiments of the present disclosure.

FIG. 6 illustrates an acoustic logging tool in accordance with embodiments of the present disclosure. The tool 610 is configured to be conveyed in a borehole intersecting a formation 480. The borehole wall 640 is lined with casing 630 filled with a downhole fluid 660, such as, for example, drilling fluid. Cement 620 fills the annulus between the borehole wall 640 and the casing 630. In one illustrative embodiment, the tool 610 may contain a sensor unit 650, including, for example, one or more acoustic transmitters and receivers (e.g., transducers), configured for evaluation of the cement bond existing between the system of the casing 630, the borehole wall 640, and the cement 620 according to known techniques. For example, electronics in the tool 610, at the surface, and/or elsewhere in system 601 (e.g., at least one processor) may be configured to use acoustic measurements to determine properties of the cement bond using known techniques, such as, for example, analysis of casing resonance.

The system 601 may include a conventional derrick 670. A conveyance device (carrier 615) which may be rigid or non-rigid, may be configured to convey the downhole tool 610 into wellbore 640 in proximity to formation 680. The carrier 615 may be a drill string, coiled tubing, a slickline, an e-line, a wireline, etc. Downhole tool 610 may be coupled or combined with additional tools (e.g., some or all the information processing system of FIG. 5). Thus, depending on the configuration, the tool 610 may be used during drilling and/or after the wellbore (borehole) 640 has been formed. While a land system is shown, the teachings of the present disclosure may also be utilized in offshore or subsea applications. The carrier 615 may include embedded conductors for power and/or data for providing signal and/or power communication between the surface and downhole equipment. The carrier 615 may include a bottom hole assembly, which may include a drilling motor for rotating a drill bit.

Figure 7A:
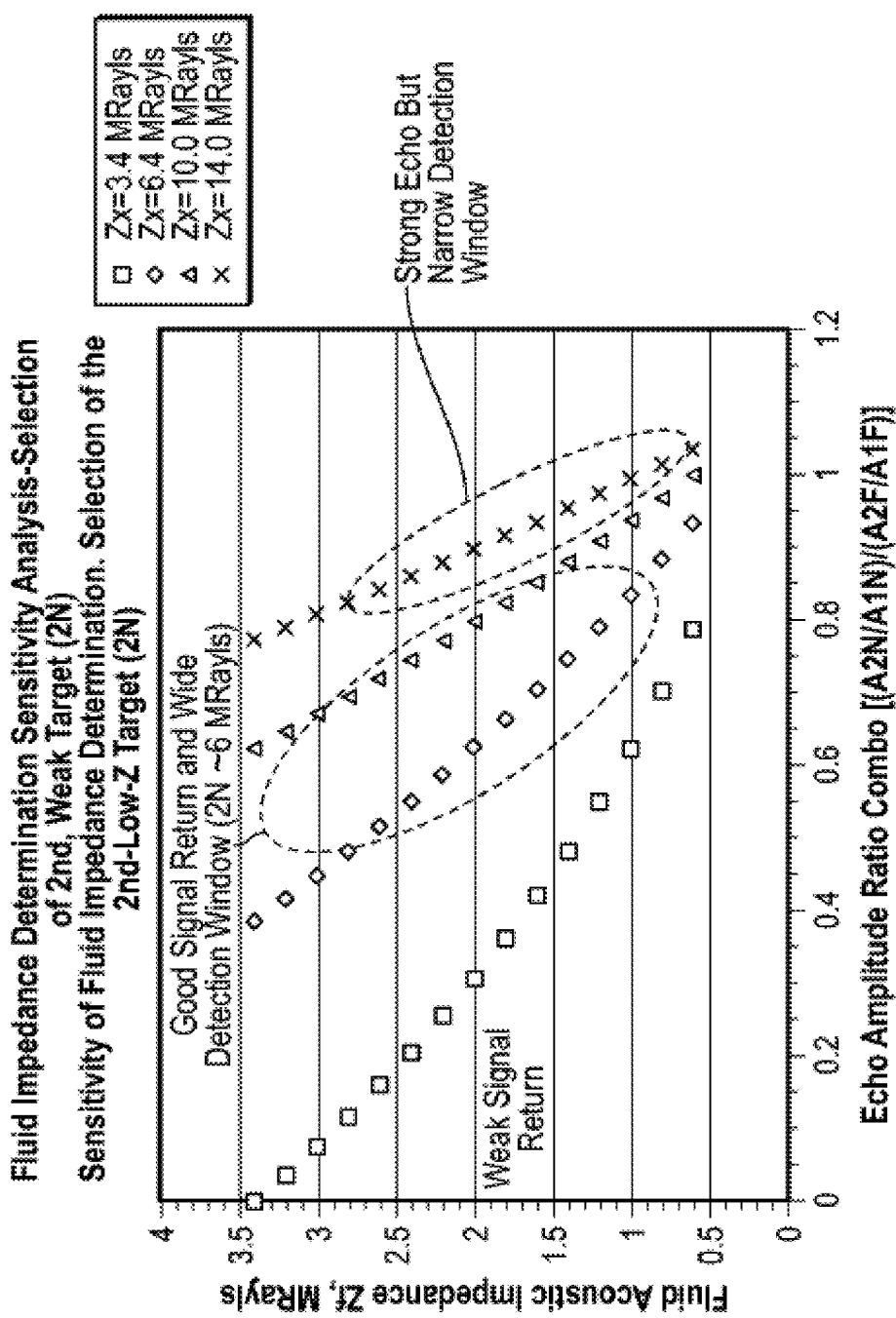
FIG. 7A illustrates variations in acoustic impedance with echo amplitude ratio for weak reflectors of various impedances.
Figure 7B:
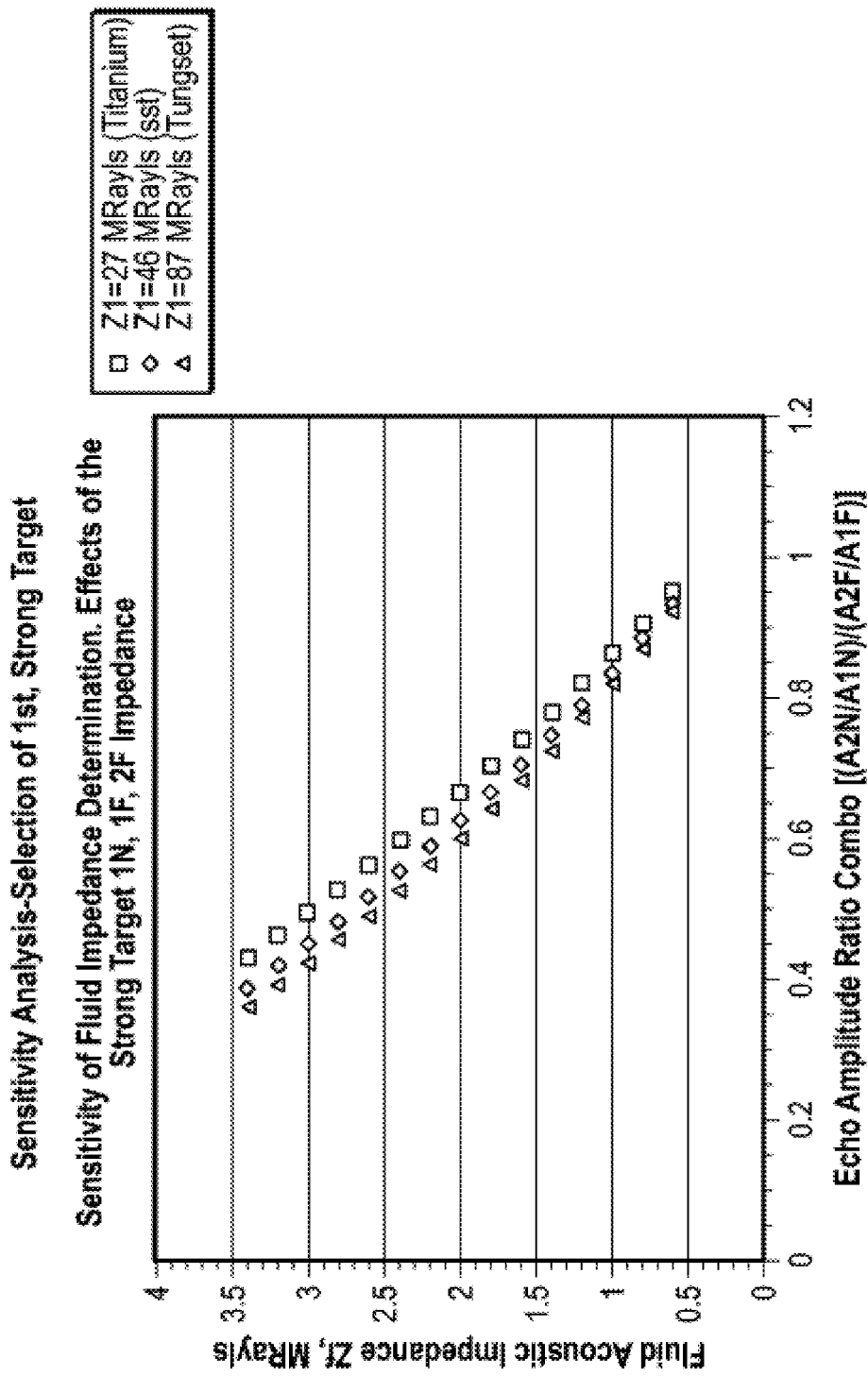
FIG. 7B illustrates variations in acoustic impedance with echo amplitude ratio for strong reflectors of various impedances.

FIG. 7A illustrates variations in acoustic impedance with echo amplitude ratio for weak reflectors of various impedances. FIG. 7B illustrates variations in acoustic impedance with echo amplitude ratio for strong reflectors of various impedances. Selection of lower impedance targets may be carried out in dependence upon a preliminary (or a priori) indication of fluid impedance. Common borehole fluid impedance is 0.8 to 3.5 MRayls. Fluid impedance may be determined from four echo amplitude values:

$$[(A_{2N}/A_{1N})]/[(A_{2F})/(A_{1F})] = [(Z_x - Z_m)/(Z_x + Z_m)]/[(Z_{sst} - Z_m)/(Z_{sst} + Z_m)]. \quad (17)$$

Figure 7C:
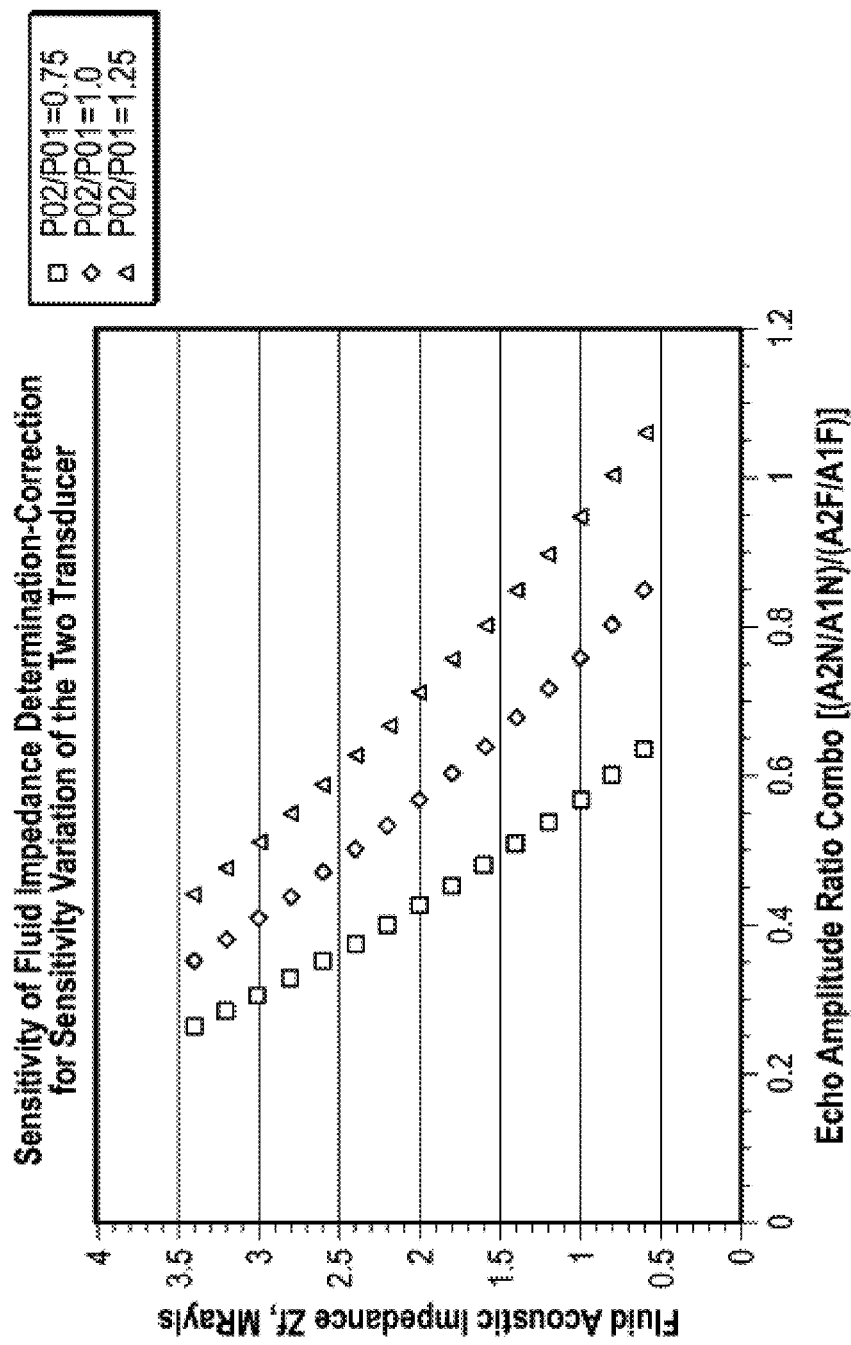
FIG. 7C illustrates effects of transducer sensitivity differences.

FIG. 7C illustrates effects of transducer sensitivity differences. These differences may be corrected. Sensitivity ratios of the transmitters may be determined from the ratio of the echo amplitudes from the two far reflectors:

$$P_{02}/P_{01} = A_{2F}/A_{1F}. \quad (18)$$

Figure 8A:
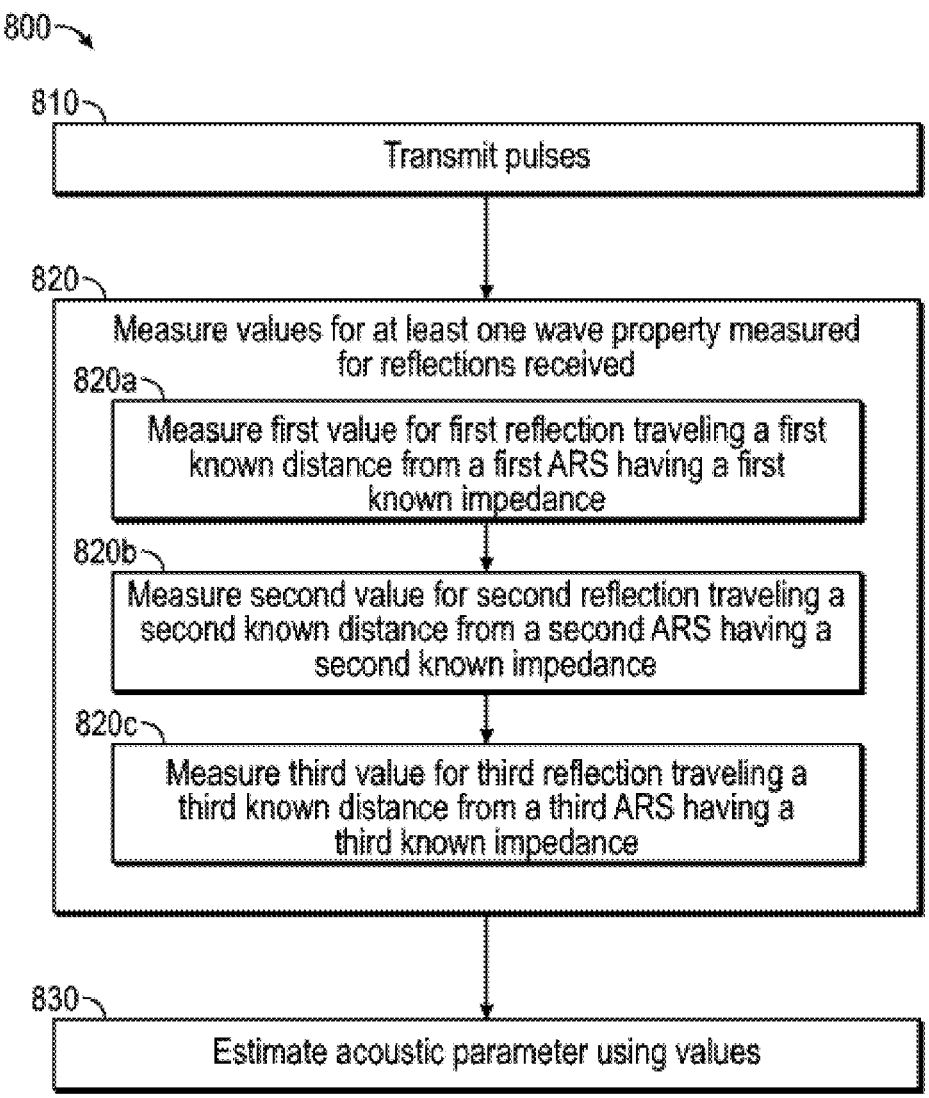
FIG. 8A shows a flow chart of a method for determining an acoustic parameter of a downhole fluid in accordance with embodiments of the present disclosure.

FIG. 8A shows a flow chart of a method 800 for determining an acoustic parameter of a downhole fluid using an acoustic assembly comprising a plurality of acoustic reflectors each having at least one acoustically reflective surface in accordance with embodiments of the present disclosure. Step 810 comprises transmitting pulses. Step 820 comprises measuring values for at least one wave property measured for reflections of the plurality of pulses received at at least one acoustic receiver. Step 820a comprises measuring a first value for a first reflection traveling a first known distance from a first acoustically reflective surface (ARS) having a first known acoustic impedance. Step 820b comprises measuring a second value for a second reflection traveling a second known distance substantially the same as the first known distance from a second acoustically reflective surface having a second known acoustic impedance substantially different than the first acoustic impedance. Step 820c comprises measuring a third value for a third reflection traveling a third known distance substantially different from each of the first distance and the second distance from a third acoustically reflective surface having a third known acoustic impedance substantially the same as the second acoustic impedance. Step 830 comprises estimating the acoustic parameter using the values.

Figure 8B:
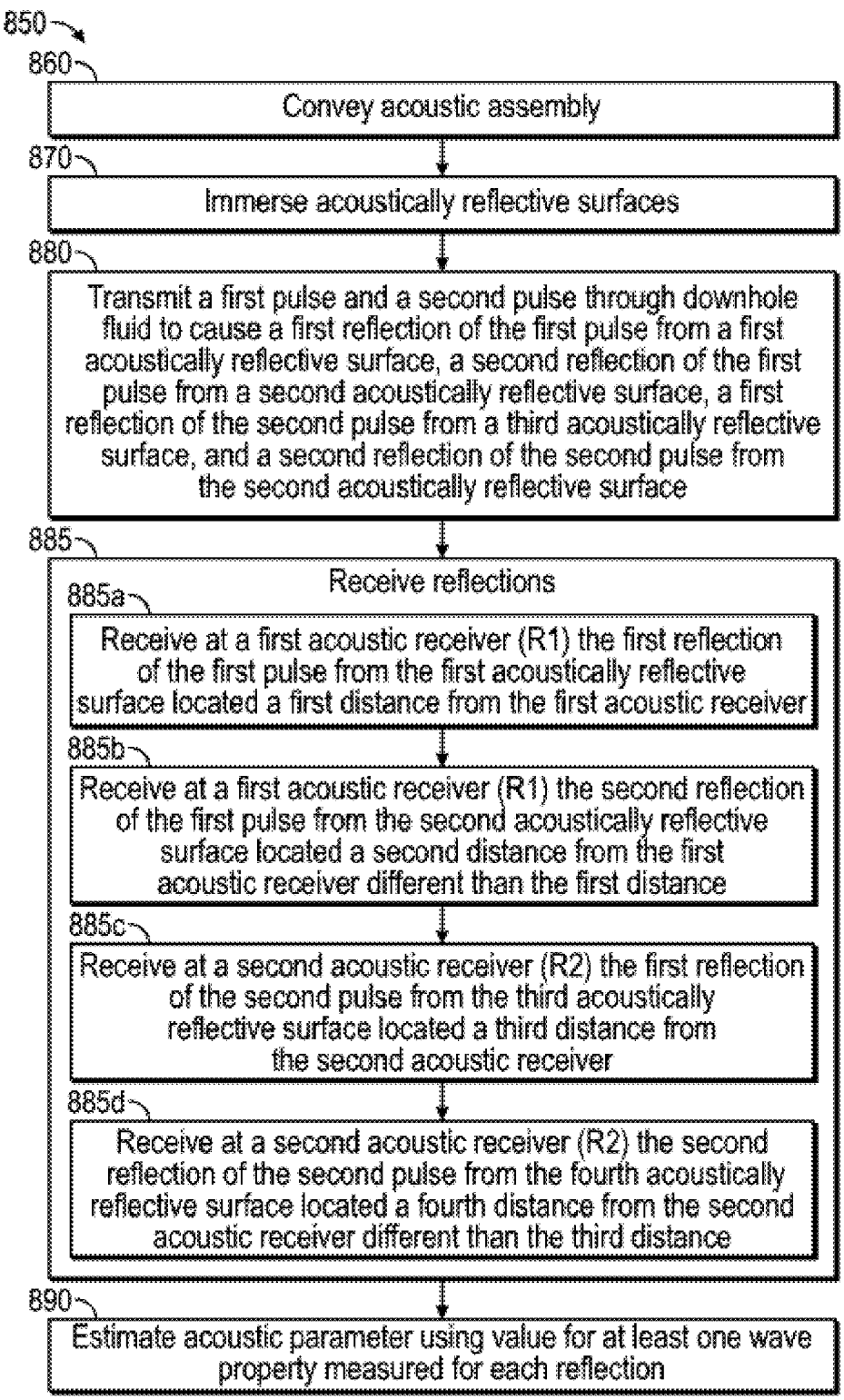
FIG. 8B shows a flow chart of a method for determining an acoustic parameter of a downhole fluid in accordance with embodiments of the present disclosure.

FIG. 8B shows a flow chart of a method 850 for determining an acoustic parameter of a downhole fluid using an acoustic assembly comprising a plurality of acoustic reflectors each having at least one acoustically reflective surface in accordance with embodiments of the present disclosure. The method 850 may include using device 100 or the like. In optional step 860, an acoustic assembly 110 is conveyed into the borehole. For example, the acoustic assembly may be conveyed using conveyance device (or carrier) 615. In optional step 870, at least one acoustically reflective surface for each of the plurality of acoustic reflectors is at least partially immersed in the downhole fluid.

Step 880 comprises transmitting a plurality of pulses. Step 880 may be carried out by transmitting a first pulse and a second pulse through the downhole fluid which causes a first reflection of the first pulse from a first acoustically reflective surface, a second reflection of the first pulse from a second acoustically reflective surface, a first reflection of the second pulse from a third acoustically reflective surface, and a second reflection of the second pulse from the second acoustically reflective surface. The first acoustically reflective surface may include a portion of a first acoustic reflector having a first impedance value and the second acoustically reflective surface may comprise a portion of a second acoustic reflector having a second impedance value substantially the same as the first impedance value. The third acoustically reflective surface may comprise a portion of a third acoustic reflector having a third impedance value and the fourth acoustically reflective surface may comprise a portion of a fourth acoustic reflector having a fourth impedance value substantially different than the third impedance value. The fourth impedance value may be substantially the same as at least one of: i) the first impedance value, and ii) the second impedance value.

Alternatively, the first acoustically reflective surface may comprise a portion of a first acoustic reflector having a first impedance value and the third acoustically reflective surface may comprise another portion of the first acoustic reflector having first impedance value. Alternatively, pulses may be transmitted in various azimuthal directions corresponding with azimuthally arrayed reflectors as described above.

At step 885 reflections are received. Step 885 may comprise substeps of receiving at a first acoustic receiver (R1) the first reflection of the first pulse from the first acoustically reflective surface located a first distance from the first acoustic receiver; receiving at the first acoustic receiver (R1) the second reflection of the first pulse from the second acoustically reflective surface located a second distance from the first acoustic receiver different than the first distance; receiving at a second acoustic receiver (R2) the first reflection of the second pulse from the third acoustically reflective surface located a third distance from the second acoustic receiver; receiving at the second acoustic receiver (R2) the second reflection of the second pulse from the fourth acoustically reflective surface located a fourth distance from the second acoustic receiver different than the third distance.

Alternatively, step 885 may comprise measuring values for at least one wave property measured for reflections of the plurality of pulses received at at least one acoustic receiver, including: a first value for a first reflection traveling a first known distance from a first acoustically reflective surface having a first known acoustic impedance; a second value for a second reflection traveling a second known distance substantially the same as the first known distance from a second acoustically reflective surface having a second known acoustic impedance substantially different than the first acoustic impedance; and a third value for a third reflection traveling a third known distance substantially different from each of the first distance and the second distance from a third acoustically reflective surface having a third known acoustic impedance substantially the same as the second acoustic impedance.

Step 890 comprises estimating the acoustic parameter using a value for at least one wave property measured for each reflection. Step 840 may be carried out by estimating the acoustic parameter using a value for at least one characteristic corresponding to each of the first reflection of the first pulse, the second reflection of the first pulse, the first reflection of the second pulse, and the second reflection of the second pulse. Alternatively, the acoustic parameter may be determined using the measured values of the reflections from the azimuthally arrayed reflectors. The at least one wave property may include at least one of travel time and amplitude.

The term "carrier" (or "conveyance device") as used above means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (analog, digital, EM, printed, etc.). The term "processor" herein includes, but is not limited to, any device that transmits, receives, manipulates, converts, calculates, modulates, transposes, carries, stores or otherwise utilizes information. A processor refers to any circuitry performing the above, and may include a microprocessor, resident memory, and/or peripherals for executing programmed instructions, application specific integrated circuits (ASICs), field programmable gate arrays (FPGAs), or any other circuitry configured to execute logic to perform methods as described herein. Fluid, as described herein, may refer to a liquid, a gas, a mixture, and so on.

"Substantially different" as used herein means not substantially the same. "Substantially the same," or "substantially similar" as used herein for a measured or estimated fluid parameter value means a value within generally held range of common deviation, such as, for example, a common statistical deviation for measurements of the same fluid (e.g., within one standard deviation, within 2 percent, etc.), such as, for example, due to noise. The term "substantially the same" as applied in the context of independent parameters (such as distance and acoustic impedance) refers to values negating the determinative effects of differences in properties of pulse reflections to estimate fluid parameters using the techniques herein, such that differences in resulting signal properties of acoustic reflections within a system having corresponding independent parameter values are negligible.

The term "near real-time" as applied to methods of the present disclosure refers to an action performed while the instrument is still downhole, after the generation of the pulse reflection and prior to movement of the tool a distance of 100 meters, 50 meters, 25 meters, 10 meters, 1 meter, or less; and may be defined as estimation of the parameter of interest within 15 minutes of generating the pulse reflection, within 10 minutes of generation, within 5 minutes of generation, within 3 minutes of generation, within 2 minutes of generation, within 1 minute of generation, or less.

The term "in-situ" as applied herein to evaluating acoustical properties of downhole fluids refers to evaluation of the fluids in the borehole (and while exterior to the tool) prior to exposure to external influences, e.g., fluid in an interval of the annulus between the borehole and the tool. By "substantially continuously," it is meant at intervals of time sufficiently small so that granularity of measurement does not appreciably affect the accuracy of determination of a related property, examples of such an interval being, for example, less than 1 minute, less than 10 seconds, less than 1 second, less than 100 milliseconds, less than 10 milliseconds, less than 1 millisecond, and so on.

Non-limiting examples of downhole fluids include drilling fluids, return fluids, formation fluids, production fluids containing one or more hydrocarbons, oils and solvents used in conjunction with downhole tools, water, brine, engineered fluids, and combinations thereof. The tool may contain a formation test apparatus according to the present disclosure, which will be described in greater detail below.

As described above, acoustic parameters of the downhole fluid such as acoustic impedance may be used in making other measurements in the borehole and estimating further parameters of interest (e.g., cement acoustic impedance), borehole wall acoustic impedance, borehole fluid identification and characterization, formation fluid sampling analysis, drilling dynamic event monitoring (gas bubbles, kicks, cuttings, etc.), and borehole washout and fracture imaging. Method embodiments may include conducting further operations in the earth formation in dependence upon such acoustic parameters and/or formation information (for example, standoff, borehole caliper and shape, formation density and porosity (correction of gamma and neutron readings), formation acoustic compressional and shear slowness, et. al.), or upon models created using ones of these. Further operations may include at least one of: i) geosteering; ii) drilling additional boreholes in the formation; iii) performing additional measurements on the casing and/or the formation; iv) estimating additional parameters of the casing and/or the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation.

Estimated parameter values and/or models of the formation (or portions thereof) may be stored (recorded) as information or visually depicted on a display. The visual depiction may include a two-dimensional (2D) or three dimensional (3D) graphical depiction of values of the parameter of interest (although one-dimensional (1D) depictions may also be displayed in some applications). The values or model may be transmitted before or after storage or display, such as, for example, being transmitted uphole (i.e., to the surface or to modules closer to the surface). For example, information may be transmitted to other downhole components, or to the surface for storage, display, or further processing. Aspects of the present disclosure relate to modeling a volume of an earth formation using the estimated parameter values, such as, for example, by associating estimated parameter values with portions of the volume of interest to which they correspond, or by representing a boundary between areas of representative or statistically similar values along with the formation in a global coordinate system. Aspects include maintaining a model comprising a representation of the earth formation stored as information including a representation of parameter values with respect to location, either as absolute values or variances thereof. The model of the earth formation generated and maintained in aspects of the disclosure may be implemented as a representation of the earth formation stored as information, including a graphic representation of parameter values or variances in parameters of interest with respect to location, e.g., in 1D, 2D, or 3D. In one example, a model of the earth formation may be maintained in a database. Modeling the earth formation may comprise associating a portion of the formation or infrastructure proximate the borehole with the parameter value as estimated herein, to generate or update the model. The information (e.g., data) may also be transmitted, stored on a non-transitory machine-readable medium, and/or rendered (e.g., visually depicted) on a display. Any of rendering the models, the values, or information representing the same may be referred to herein as "displaying the parameter of interest on a display."

The processing of the measurements by a processor may occur at the tool, the surface, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

The term "processor" or "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on. Thus, a processor may be configured to perform one or more methods as described herein, and configuration of the processor may include operative connection with resident memory and peripherals for executing programmed instructions.

In some embodiments, estimation of the parameter of interest may involve applying a model, as described herein above. The model may include, but is not limited to, (i) a mathematical equation, (ii) an algorithm, (iii) a database of associated parameters, (iv) a rule set, (v) a heuristic, (vi) a function, and (vii) other relational techniques, or a combination thereof.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the system generally, may be carried out in a completely automated fashion or through interaction with personnel via notifications, graphical representations, user interfaces and the like. Reference information accessible to the processor may also be used.

While the disclosure has been described with reference to example embodiments, it will be understood that various changes may be made and equivalents may be substituted for elements thereof without departing from the scope of the disclosure. In addition, many modifications will be appreciated to adapt a particular instrument, situation or material to the teachings of the disclosure without departing from the essential scope thereof. Further embodiments may include direct measurement wireline embodiments, drilling embodiments employing a sample chamber, LWT tools, including drop subs and the like, and so on. While the present disclosure is discussed in the context of a hydrocarbon producing well, it should be understood that the present disclosure may be used in any borehole environment (e.g., a geothermal well) with any type of downhole fluid.

While the foregoing disclosure is directed to particular embodiments, various modifications will be apparent to those skilled in the art. It is intended that all variations be embraced by the foregoing disclosure.

The invention claimed is:

1. A method of determining an acoustic parameter of a downhole fluid using an acoustic assembly comprising a plurality of acoustic reflectors each having at least one acoustically reflective surface at least partially immersed in the downhole fluid, the method comprising:
   estimating the acoustic parameter using a value for at least one wave property measured for:
   a first near reflection received at a first acoustic receiver (R1) of a first pulse from a first near reflector located a first distance from the first acoustic receiver, the first near reflector having a first impedance value;
   a first far reflection received at the first acoustic receiver (R1) of the first pulse from a first far reflector located a second distance from the first acoustic receiver different than the first distance, the first far reflector having a second impedance value;
   a second near reflection received at a second acoustic receiver (R2) of a second pulse from a second near reflector located a third distance from the second acoustic receiver, wherein the first near reflector and the second near reflector are physically separate surfaces, the second near reflector has a third impedance value, and the third impedance value is substantially different than the first impedance value;
   a second far reflection received at the second acoustic receiver (R2) of the second pulse from a second far reflector located a fourth distance from the second acoustic receiver different than the third distance;
   wherein the first pulse, the first near reflection of the first pulse, the first far reflection of the first pulse, the second pulse, the second near reflection of the second pulse, and the second far reflection of the second pulse are each transmitted through the downhole fluid, and wherein estimating the acoustic parameter comprises estimating an acoustic impedance for the downhole fluid based on a first amplitude of the first near reflection, a second amplitude of the first far reflection, a third amplitude of the second near reflection and a fourth amplitude of the second far reflection.

2. The method of claim 1, wherein the at least one wave property comprises travel time and amplitude.

3. The method of claim 1, wherein the second far reflector has a fourth impedance value that is substantially different than the third impedance value.

4. The method of claim 1, wherein the first near reflector comprises a portion of a first acoustic reflector having the first impedance value and the second far reflector comprises another portion of the first acoustic reflector.

5. The method of claim 1, further comprising transmitting acoustic pulses using at least one acoustic transducer to generate at least one of the first near reflection of the first pulse, the first far reflection of the first pulse, the second near reflection of the second pulse, and the second far reflection of the second pulse.

6. The method of claim 1, wherein estimating the acoustic parameter comprises estimating an attenuation coefficient for the downhole fluid using at least one of the first far reflection and the first near reflection received at the first acoustic receiver, and at least one of the second reflection and the second near reflection received at the second acoustic receiver.

7. The method of claim 1, wherein the acoustic impedance for the downhole fluid is estimated using a cross-product ratio, the cross-product ratio being a ratio of a first product to a second product, wherein:
the first product is a product of the first amplitude of the first near reflection received at the first acoustic receiver and the fourth amplitude of the second far reflection received at the second acoustic receiver; and
the second product is a product of the second amplitude of the first far reflection received at the first acoustic receiver and the third amplitude of the second near reflection received at the second acoustic receiver.

8. The method of claim 7, wherein the first distance is less than the second distance and the third distance is less than the fourth distance.

9. The method of claim 1, wherein the first distance is less than the second distance and the third distance is less than the fourth distance, and estimating the acoustic parameter comprises estimating the acoustic impedance for the downhole fluid using the third impedance value of the second near reflector and a fourth impedance value of the second far reflector different than the third impedance value of the second near reflector.

10. The method of claim 9, wherein the second near reflector comprises a first material having a first acoustic impedance and the second far reflector comprises a second material having a second acoustic impedance, the first acoustic impedance being less than the second acoustic impedance.

11. The method of claim 1, wherein the second impedance value is substantially the same as the first impedance value.

12. The method of claim 11, wherein the second far reflector has a fourth impedance value that is substantially different than the third impedance value.

13. The method of claim 12, wherein the fourth impedance value is substantially the same as at least one of: i) the first impedance value, and ii) the second impedance value.

14. A method of determining an acoustic parameter of a downhole fluid using an acoustic assembly comprising a plurality of acoustic reflectors each having at least one acoustically reflective surface at least partially immersed in the downhole fluid, the method comprising:
estimating the acoustic parameter using a value for at least one wave property measured for:
a first near reflection received at a first acoustic receiver (R1) of a first pulse from a first near reflector located a first distance from the first acoustic receiver, the first near reflection having a first amplitude, the first near reflector having a first impedance value;
a first far reflection received at the first acoustic receiver (R1) of the first pulse from a first far reflector located a second distance from the first acoustic receiver different than the first distance, the first far reflection having a second amplitude, the first far reflector having a second impedance value;
a second near reflection received at a second acoustic receiver (R2) of a second pulse from a second near reflector located a third distance from the second acoustic receiver, the second near reflection having a third amplitude, wherein the first near reflector and the second near reflector are physically separate surfaces, the second near reflector has a third impedance value, and the third impedance value is substantially different than the first impedance value;
a second far reflection received at the second acoustic receiver (R2) of the second pulse from a second far reflector located a fourth distance from the second acoustic receiver different than the third distance, the second far reflection having a fourth amplitude;
wherein the first pulse, the first near reflection of the first pulse, the first far reflection of the first pulse, the second pulse, the second near reflection of the second pulse, and the second far reflection of the second pulse are each transmitted through the downhole fluid, and wherein estimating the acoustic parameter comprises estimating an acoustic impedance for the downhole fluid using a cross-product ratio, the cross-product ratio being a ratio of a first product to a second product, wherein:
the first product is a product of the first amplitude of the first near reflection and the fourth amplitude of the second far reflection; and
the second product is a product of the second amplitude of the first far reflection and the third amplitude of the second near reflection.

* * * * *